(12) United States Patent
Hiasa et al.

(10) Patent No.: US 11,402,856 B2
(45) Date of Patent: Aug. 2, 2022

(54) CONTROL DEVICE OF VEHICLE

(71) Applicant: TOYOTA JIDOSHA KABUSHIKI KAISHA, Toyota (JP)

(72) Inventors: Yasuhiro Hiasa, Miyoshi (JP); Atsushi Tabata, Okazaki (JP); Koichi Okuda, Toyota (JP); Tooru Matsubara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 16/884,345

(22) Filed: May 27, 2020

(65) Prior Publication Data

US 2021/0034074 A1    Feb. 4, 2021

(30) Foreign Application Priority Data

Jul. 30, 2019  (JP) .............................. JP2019-140349

(51) Int. Cl.
  *G05D 1/08*  (2006.01)
  *B60R 16/03*  (2006.01)
(52) U.S. Cl.
  CPC ........... *G05D 1/0891* (2013.01); *B60R 16/03* (2013.01)
(58) Field of Classification Search
  CPC ................. G05D 1/0891; B60R 16/03; B60W 2510/0633; B60W 2510/0652; B60W 2510/083; B60W 2710/0677; B60W 10/06; B60W 10/08; B60W 10/101; B60W 20/15; B60W 30/1882; B60W 2540/10; B60W 20/40; B60W 2150/0638; B60W 2510/0657; B60W 2710/0644; B60W 2710/0666; B60K 6/445; Y02T 10/62; F02D 29/02; F02D 41/0007
  See application file for complete search history.

(56) References Cited

U.S. PATENT DOCUMENTS

| | | | |
|---|---|---|---|
| 2017/0129481 A1* | 5/2017 | Umetsu | B60W 30/045 |
| 2018/0274461 A1* | 9/2018 | Ujihara | B60W 10/06 |

FOREIGN PATENT DOCUMENTS

JP  2009166659 A  7/2009

\* cited by examiner

*Primary Examiner* — Marthe Y Marc-Coleman
(74) *Attorney, Agent, or Firm* — Hunton Andrews Kurth LLP

(57) ABSTRACT

An electronic control unit of a vehicle includes (a) a target operating point setting unit that calculates a request driving force requested for a vehicle, and set a target engine operating point through a slow change process for obtaining an engine output that slowly changes with respect to a request engine output implementing the request driving force, (b) a smoothing factor setting unit that changes a smoothing factor used for the slow change process according to an amount of change in a turbocharging pressure in the engine and sets the smoothing factor to a smaller value when the amount of change in the turbocharging pressure is smaller than when the amount of change in the turbocharging pressure is larger, and (c) a drive controller that controls the engine and the continuously variable transmission such that the engine operating point is the target engine operating point.

4 Claims, 14 Drawing Sheets

FIG. 6

| TRAVELING MODE | | | C1 | B1 | MG1 | MG2 |
|---|---|---|---|---|---|---|
| EV | FORWARD/ BACKWARD | SINGLE DRIVE DRIVE | | | G | M |
| | | SINGLE DRIVE WITH ENGINE BRAKE | △ | △ | G | M |
| | | DUAL DRIVE | O | O | M | M |
| HV | FORWARD | HIGH | | O | G | M |
| | | LOW | O | | G | M |
| | BACKWARD | LOW | O | | G | M |

FIG. 13

| AT GEAR STAGE | C1 | C2 | B1 | B2 | F1 |
|---|---|---|---|---|---|
| 1st | O |  |  | △ | O |
| 2nd | O |  | O |  |  |
| 3rd | O | O |  |  |  |
| 4th |  | O | O |  |  |
| Rev | O |  |  | O |  |

CONTROL DEVICE OF VEHICLE

CROSS-REFERENCE TO RELATED APPLICATION

This application claims priority to Japanese Patent Application No. 2019-140349 filed on Jul. 30, 2019, incorporated herein by reference in its entirety.

BACKGROUND

1. Technical Field

The disclosure relates to a control device for a vehicle in which power output from an engine having a turbocharger is transmitted to drive wheels through a continuously variable transmission.

2. Description of Related Art

A control device of a vehicle is known that sets a target operating point of an engine through a slow change process for obtaining an engine output that slowly changes with respect to a request engine output achieving a request driving force based on the request driving force calculated based on an accelerator operation amount. One example thereof is a control device of a vehicle disclosed in Japanese Unexamined Patent Application Publication No. 2009-166659 (JP 2009-166659 A). JP 2009-166659 A discloses that a slow change process is performed on a request driving force and a target operating point of an engine is set through the driving force subjected to the slow change process.

SUMMARY

When the engine output changes slowly with respect to the request engine output, the vehicle speed can be increased as the engine speed increases during vehicle acceleration. In this way, so-called rubber band feel is suppressed, and thus driving feeling is improved. However, in an engine having a turbocharger, the response delay of the turbocharging pressure and the slow change of the engine output are combined due to the response of the turbocharging pressure to cause a feeling of sluggish, which may rather result in deterioration of driving feeling.

The disclosure has been made in view of the above circumstances, and an object of the disclosure is to provide a control device for a vehicle capable of suppressing a feeling of sluggish while suppressing deterioration of driving feeling according to the response of a turbocharging pressure.

An aspect of the disclosure relates to a control device of a vehicle including (a) an engine having a turbocharger and a continuously variable transmission provided in a power transmission path between the engine and drive wheels. The control device of a vehicle includes (b) a target operating point setting unit, (c) a smoothing factor setting unit, and (d) a drive controller. The target operating point setting unit is configured to calculate a request driving force requested for the vehicle based on an accelerator operation amount, and set a target operating point of the engine through a slow change process for obtaining an engine output that slowly changes with respect to a request engine output achieving the calculated request driving force based on the calculated request driving force. The smoothing factor setting unit is configured to change a smoothing factor used for the slow change process according to an amount of change in a turbocharging pressure in the engine and set the smoothing factor to a smaller value when the amount of change in the turbocharging pressure is smaller than when the amount of change in the turbocharging pressure is larger. The drive controller is configured to control the engine and the continuously variable transmission such that the operating point of the engine becomes the target operating point.

In the control device according to the aspect, the smoothing factor setting unit may be further configured to change the smoothing factor according to an amount of change in an engine speed and set the smoothing factor to a larger value when the amount of change in the engine speed is larger than when the amount of change in the engine speed is smaller.

In the control device according to the aspect, the smoothing factor setting unit may be further configured to change the smoothing factor according to an amount of change in the request driving force and set the smoothing factor to be a larger value when the amount of change in the request driving force is larger than when the amount of change in the request driving force is smaller.

In the control device according to the aspect, (a) the vehicle may include a rotating machine connected to the power transmission path, and (b) the smoothing factor setting unit may be further configured to change the smoothing factor according to a torque assist rate of the rotating machine and set the smoothing factor to be a larger value when the torque assist rate is smaller than when the torque assist rate is larger.

According to the aspect of the control device of the disclosure, (a) a target operating point setting unit configured to calculate a request driving force requested for the vehicle based on an accelerator operation amount, and set a target operating point of the engine through a slow change process for obtaining an engine output that slowly changes with respect to a request engine output achieving the calculated request driving force based on the calculated request driving force, (b) a smoothing factor setting unit configured to change a smoothing factor used for the slow change process according to an amount of change in a turbocharging pressure in the engine and set the smoothing factor to a smaller value when the amount of change in the turbocharging pressure is smaller than when the amount of change in the turbocharging pressure is larger, and (c) a drive controller configured to control the engine and the continuously variable transmission such that the operating point of the engine becomes the target operating point are included. When the amount of change in the turbocharging pressure is large, the smoothing factor used for the slow change process is set to a relatively large value, resulting in suppression of the rubber band feel, and when the amount of change in the turbocharging pressure is small, the smoothing factor used for the slow change process is set to a relatively small value, resulting in suppression of the feeling of sluggish. In this way, the rubber band feel is suppressed by the slow change process, thereby making it possible to suppress the deterioration of the driving feeling and suppress the feeling of sluggish when the amount of change in the turbocharging pressure is small.

According to the aspect of the control device of the disclosure, the smoothing factor setting unit may be further configured to change the smoothing factor according to an amount of change in an engine speed and set the smoothing factor to a larger value when the amount of change in the engine speed is larger than when the amount of change in the engine speed is smaller. When the amount of change in the engine speed is large, the rubber band feel tends to be remarkable, but when the amount of change in the engine speed is large, the smoothing factor is set to a relatively large value, thereby suppressing the rubber band feel and thus improving the driving feeling.

According to the aspect of the control device of the disclosure, the smoothing factor setting unit may be further configured to change the smoothing factor according to an amount of change in the request driving force and set the smoothing factor to be a larger value when the amount of change in the request driving force is larger than when the amount of change in the request driving force is smaller. When the amount of change in the request driving force is large, the vehicle speed is remarkably increased and thus the rubber band feel is likely to occur. However, since the smoothing factor is set to a relatively large value when the amount of change in the request driving force is large, the rubber band feel is suppressed and thus the driving feeling is improved.

According to the aspect of the control device of the disclosure, (a) the vehicle may include a rotating machine connected to the power transmission path, and (b) the smoothing factor setting unit may be further configured to change the smoothing factor according to a torque assist rate of the rotating machine and set the smoothing factor to be a larger value when the torque assist rate is smaller than when the torque assist rate is larger. When the torque assist rate of the rotating machine is smaller, the change in the operating point of the engine is larger when the torque assist rate is larger, and as a result, a rubber band feel is likely to occur. When the torque assist rate is smaller, the smoothing factor is set to a large value than when the torque assist rate is larger, and thus, the operating point of the engine can be slowly changed. In this way, the rubber band feel is suppressed and thus the driving feeling is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is an engagement operation table for describing a relationship between each traveling mode and a combination of operating states of a clutch and a brake used for the traveling mode;

FIG. 13 is an engagement operation table illustrating a relationship between a shift operation of a stepped transmission unit illustrated in FIG. 12 and a combination of operating states of engagement devices used therefor.

DETAILED DESCRIPTION OF EMBODIMENTS

Hereinafter, embodiments of the disclosure will be described in detail with reference to the drawings. In the following embodiments, the drawings are simplified or modified as appropriate, and the dimensional ratios, shapes, and the like of the respective parts are not necessarily drawn accurately.

Figure 1:
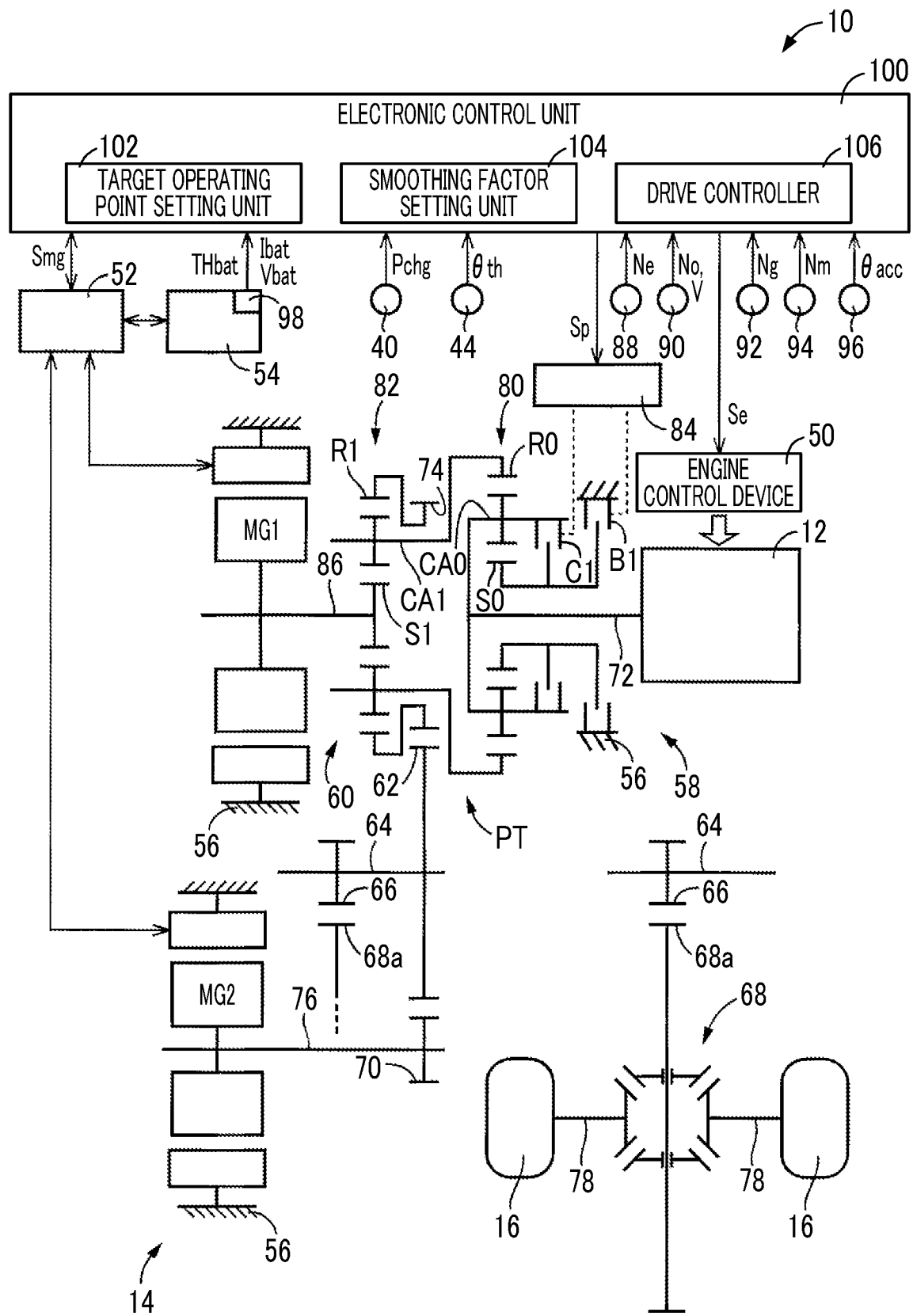
FIG. 1 is a schematic configuration diagram of a vehicle on which an electronic control unit according to a first embodiment of the disclosure is mounted, and is a functional block diagram illustrating main parts of a control functions for various controls in the vehicle.

FIG. 1 is a schematic configuration diagram of a vehicle 10 on which an electronic control unit 100 according to a first embodiment of the disclosure is mounted, and is a functional block diagram illustrating main parts of a control functions for various controls in the vehicle 10. The vehicle 10 is a hybrid vehicle including an engine 12, a first rotating machine MG1, a second rotating machine MG2, a power transmission device 14, and drive wheels 16.

Figure 2:
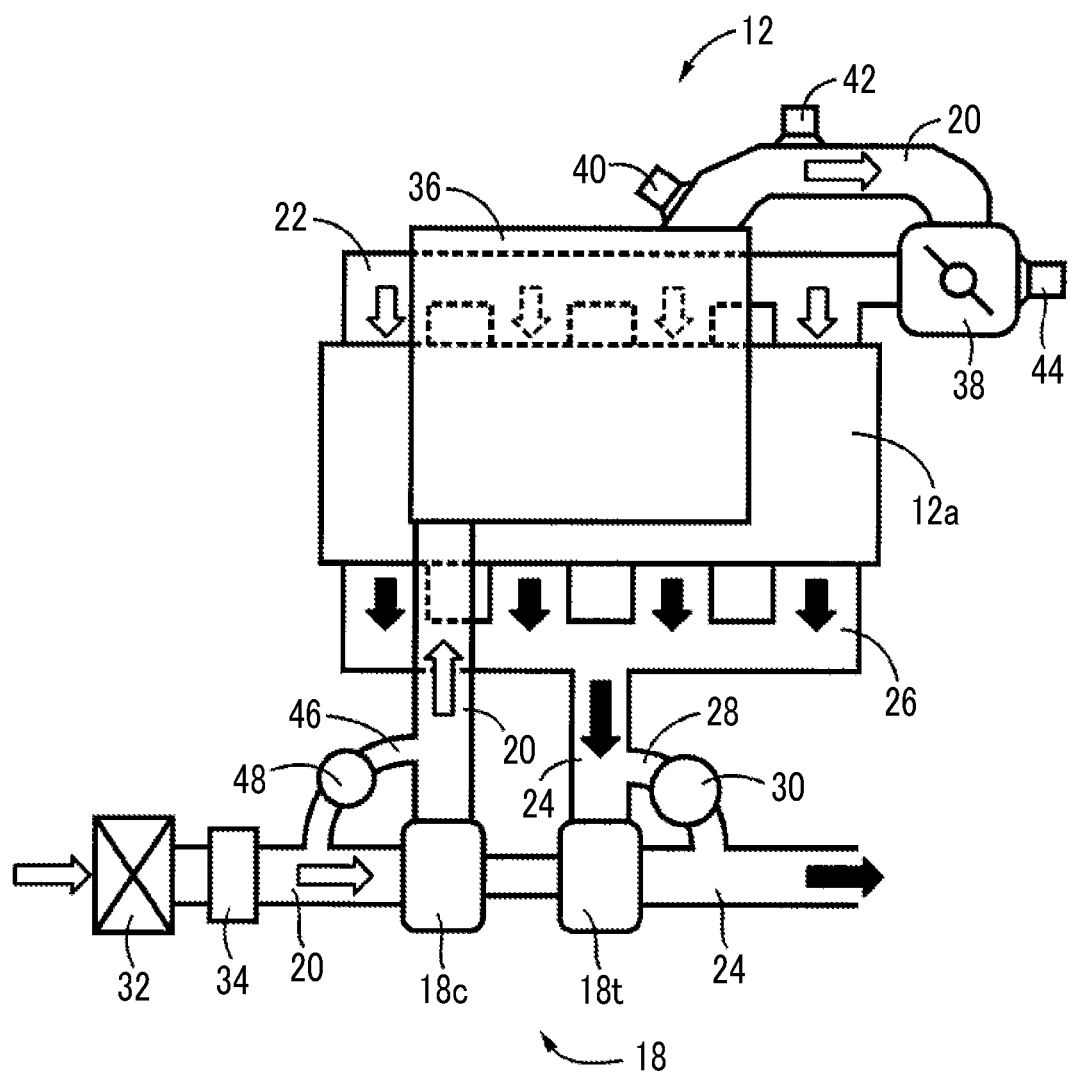
FIG. 2 is a diagram illustrating a schematic configuration of an engine illustrated in FIG. 1.

FIG. 2 is a diagram illustrating a schematic configuration of the engine 12 illustrated in FIG. 1. The engine 12 is a power source for causing the vehicle 10 to travel and is a known internal combustion engine such as a gasoline engine or a diesel engine having a turbocharger 18, that is, an engine with a turbocharger 18. An intake pipe 20 is provided in an intake system of the engine 12, and the intake pipe 20 is connected to an intake manifold 22 attached to an engine main body 12a. An exhaust pipe 24 is provided in an exhaust system of the engine 12, and the exhaust pipe 24 is connected to an exhaust manifold 26 attached to the engine main body 12a. The turbocharger 18 is a known exhaust turbine type turbocharger, that is, a turbocharger having a compressor 18c provided in the intake pipe 20 and a turbine 18t provided in the exhaust pipe 24. The turbine 18t is driven to rotate by the flow of discharging gas, that is, exhaust gas. The compressor 18c is connected to the turbine 18t. Sucking air for the engine 12, that is, intake air, is compressed by the compressor 18c being rotationally driven by the turbine 18t.

The exhaust pipe 24 is provided with an exhaust bypass 28 for bypassing the turbine 18t to flow exhaust gas from upstream to downstream of the turbine 18t. The exhaust bypass 28 is provided with a wastegate valve 30 (hereinafter referred to as 'WGV 30') for continuously controlling the ratio between the exhaust gas passing through the turbine 18t and the exhaust gas passing through the exhaust bypass 28. The valve opening degree of the WGV 30 is continuously adjusted by operating an actuator (not shown) by an electronic control unit 100 to be described later. The larger the valve opening degree of the WGV 30 is, the more easily the exhaust gas of the engine 12 is discharged through the exhaust bypass 28. Therefore, in the turbocharging state of the engine 12 in which the turbocharging operation of the turbocharger 18 is effective, the turbocharging pressure Pchg [Pa] by the turbocharger 18 decreases as the valve opening degree of the WGV 30 increases. The turbocharging pressure Pchg by the turbocharger 18 is the pressure of the intake air, and is the air pressure downstream of the compressor 18c in the intake pipe 20. Further, the low part of the turbocharging pressure Pchg is, for example, the part representing the intake pressure in the non-turbocharging state of the engine 12 in which the turbocharging operation of the turbocharger 18 is not effective at all, in other words, the part representing the pressure of intake air in the engine without the turbocharger 18.

An air cleaner 32 is provided at an inlet of the intake pipe 20, and an air flow meter 34 for measuring an intake air amount of the engine 12 is provided in the intake pipe 20 downstream of the air cleaner 32 and upstream of the compressor 18c. An intercooler 36, which is a heat exchanger for cooling intake air compressed by the turbocharger 18 by exchanging heat between the intake air and outside air or coolant, is provided in the intake pipe 20 downstream of the compressor 18c. An electronic throttle valve 38, which is controlled to be opened and closed by operating a throttle actuator (not shown) by an electronic control unit 100 to be described later, is provided in the intake pipe 20 downstream of the intercooler 36 and upstream of the intake manifold 22. In the intake pipe 20 between the intercooler 36 and the electronic throttle valve 38, a turbocharging pressure sensor 40 for detecting a turbocharging pressure Pchg by the turbocharger 18 and an intake air temperature sensor 42 for detecting an intake air temperature which is the temperature of the intake air are provided. In the vicinity of the electronic throttle valve 38, for example, in a throttle actuator, a throttle valve opening degree sensor 44 for detecting a throttle valve opening degree θth [%], which is an opening degree of the electronic throttle valve 38, is provided.

In the intake pipe 20, an air recirculation bypass 46 for bypassing the compressor 18c from downstream to upstream of the compressor 18c to recirculate air is provided. In the air recirculation bypass 46, for example, an air bypass valve 48 is provided that is opened to suppress generation of surge and protect the compressor 18c, when the electronic throttle valve 38 is suddenly closed.

In the engine 12, an engine control device 50 (refer to FIG. 1) including the electronic throttle valve 38, a fuel injection device, an ignition device, the WGV 30, and the like, is controlled by the electronic control unit 100 to be described later, which, in turn, the engine torque Te [Nm], which is the output torque of the engine 12, is controlled.

Returning to FIG. 1, the first rotating machine MG1 and the second rotating machine MG2 are rotating electric machines having a function as an electric motor (motor) and a function as a generator, and are so-called motor generators. The first rotating machine MG1 and the second rotating machine MG2 can be power sources for the vehicle 10 to travel. Each of the first rotating machine MG1 and the second rotating machine MG2 is connected to a battery 54 provided in the vehicle 10 through an inverter 52 provided in the vehicle 10. In the first rotating machine MG1 and the second rotating machine MG2, an MG1 torque Tg [Nm], which is the output torque of the first rotating machine MG1, and an MG2 torque Tm [Nm], which is the output torque of the second rotating machine MG2 are controlled, respectively, by controlling the inverter 52 by the electronic control unit 100, which will be described later. For example, in the case of positive rotation, the output torque of the rotating machine is a powering torque at a positive torque during accelerating, and a regenerative torque at a negative torque during decelerating. The battery 54 is a power storage device that exchanges electric power with each of first rotating machine MG1 and second rotating machine MG2. The first rotating machine MG1 and the second rotating machine MG2 are provided in a case 56, which is a non-rotating member attached to the vehicle body.

The power transmission device 14 includes a transmission unit 58, a differential unit 60, a driven gear 62, a driven shaft 64, a final gear 66, a differential gear 68, a reduction gear 70, and the like, in the case 56. The transmission unit 58 and the differential unit 60 are arranged coaxially with an input shaft 72, which is an input rotating member of the transmission unit 58. The transmission unit 58 is connected to the engine 12 through an input shaft 72 or the like. The differential unit 60 is connected in series with the transmission unit 58. The driven gear 62 meshes with a drive gear 74, which is an output rotating member of the differential unit 60. The driven shaft 64 fixes the driven gear 62 and the final gear 66 such that the driven gear 62 and the final gear 66 cannot rotate relative to each other. The final gear 66 has a smaller diameter than the driven gear 62. The differential gear 68 meshes with the final gear 66 through a differential ring gear 68a. The reduction gear 70 has a smaller diameter than the driven gear 62 and meshes with the driven gear 62. The reduction gear 70 is connected to the rotor shaft 76 of the second rotating machine MG2, which is disposed in parallel with the input shaft 72 separately from the input shaft 72, and is connected to the second rotating machine MG2 to transmit power. In addition, the power transmission device 14 includes an axle 78 connected to the differential gear 68, and the like. It is noted that the second rotating machine MG2 of the embodiment corresponds to a "rotating machine" in the disclosure.

The power transmission device 14 configured as described above is suitably used for a front engine front drive (FF) type or rear engine rear drive (RR) type vehicle. In the power transmission device 14, the power output from each of the engine 12, the first rotating machine MG1, and the second rotating machine MG2 is transmitted to the driven gear 62. The power transmitted to the driven gear 62 is transmitted to the drive wheels 16 through a final gear 66, the differential gear 68, the axle 78 and the like. Thus, the second rotating machine MG2 is connected to the drive wheels 16 to transmit power. The transmission unit 58, the differential unit 60, the driven gear 62, the driven shaft 64, the final gear 66, the differential gear 68, and the axle 78 in the power transmission device 14 form a power transmission path PT provided between the engine 12 and the drive wheels 16.

The transmission unit 58 includes a first planetary gear mechanism 80, a clutch C1, and a brake B1. The first planetary gear mechanism 80 is a known single pinion type planetary gear device including a sun gear S0, a carrier CA0, and a ring gear R0. The differential unit 60 includes a second planetary gear mechanism 82. The second planetary gear mechanism 82 is a known single pinion type planetary gear device including a sun gear S1, a carrier CA1, and a ring gear R1.

Each of the clutch C1 and the brake B1 is a hydraulic friction engagement device including a multi-plate or single-plate clutch or brake pressed by a hydraulic actuator, a band brake tightened by a hydraulic actuator, and the like. With a hydraulic control circuit 84 provided in the vehicle 10 being controlled by an electronic control unit 100, which will be described later, operating states of the clutch C1 and the brake B1, such as engagement and release, are switched according to regulated hydraulic pressures output from the hydraulic control circuit 84, respectively.

The first planetary gear mechanism 80, the second planetary gear mechanism 82, the clutch C1, and the brake B1 are connected as shown in FIG. 1.

In a state where both the clutch C1 and the brake B1 are released, the differential of the first planetary gear mechanism 80 is allowed. In this state, since the reaction torque of the engine torque Te cannot be obtained in the sun gear S0, the transmission unit 58 is in a neutral state in which mechanical power cannot be transmitted, that is, in a neutral state. In a state in which the clutch C1 is engaged and the brake B1 is released, the first planetary gear mechanism 80 is rotated with rotating elements integrally. In this state, the rotation of the engine 12 is transmitted at a constant speed from the ring gear R0 to the carrier CA1. In a state where the clutch C1 is released and the brake B1 is engaged, in the first planetary gear mechanism 80, the rotation of the sun gear S0 is stopped, and the rotation of the ring gear R0 is faster than the rotation of the carrier CA0. In this state, the rotation of engine 12 is accelerated and output from ring gear R0.

As described above, the transmission unit 58 functions as a two-stage stepped transmission that can switch between a low gear with a gear ratio of "1.0", meaning a direct coupled condition, and a high gear with a gear ratio of "0.7", meaning an overdrive condition, for example. When the clutch C1 and the brake B1 are both engaged, the rotation of each rotating element of the first planetary gear mechanism 80 is stopped. In this state, the rotation of the ring gear R0, which is the output rotating member of the transmission unit 58, is stopped, and thus the rotation of the carrier CA1, which is the input rotating member of the differential unit 60, is stopped.

In the second planetary gear mechanism 82, the carrier CA1 is a rotating element connected to the ring gear R0, which is an output rotating member of the transmission unit 58, and functions as an input rotating member of the differential unit 60. The sun gear S1 is integrally connected to the rotor shaft 86 of the first rotating machine MG1, and is a rotating element to which the first rotating machine MG1 is connected to transmit power. The ring gear R1 is integrally connected to the drive gear 74, is a rotating element connected to the drive wheels 16 to transmit power, and functions as an output rotating member of the differential unit 60.

The second planetary gear mechanism 82 is a power split device mechanically splitting the power of the engine 12 to be input to the carrier CA1 through the transmission unit 58 into the first rotating machine MG1 and the drive gear 74. That is, the second planetary gear mechanism 82 is a differential mechanism splitting the power of the engine 12 into the drive wheels 16 and the first rotating machine MG1 to transmit the split power. In the second planetary gear mechanism 82, the carrier CA1 functions as an input element, the sun gear S1 functions as a reaction element, and the ring gear R1 functions as an output element. The differential unit 60 forms an electric transmission mechanism, for example, an electric continuously variable transmission, controlling the differential state of the second planetary gear mechanism 82 (that is, the differential state of the differential unit 60) by controlling the operating state of the first rotating machine MG1, which is connected to the second planetary gear mechanism 82 to transmit power. The differential unit 60, which is a continuously variable transmission, is provided on the power transmission path PT. The first rotating machine MG1 is a rotating machine to which the power of the engine 12 is transmitted. Since the transmission unit 58 is overdriven, the increase in the torque of the first rotating machine MG1 is suppressed. In addition, the differential unit 60 corresponds to "the continuously variable transmission" in the disclosure.

Figure 3:
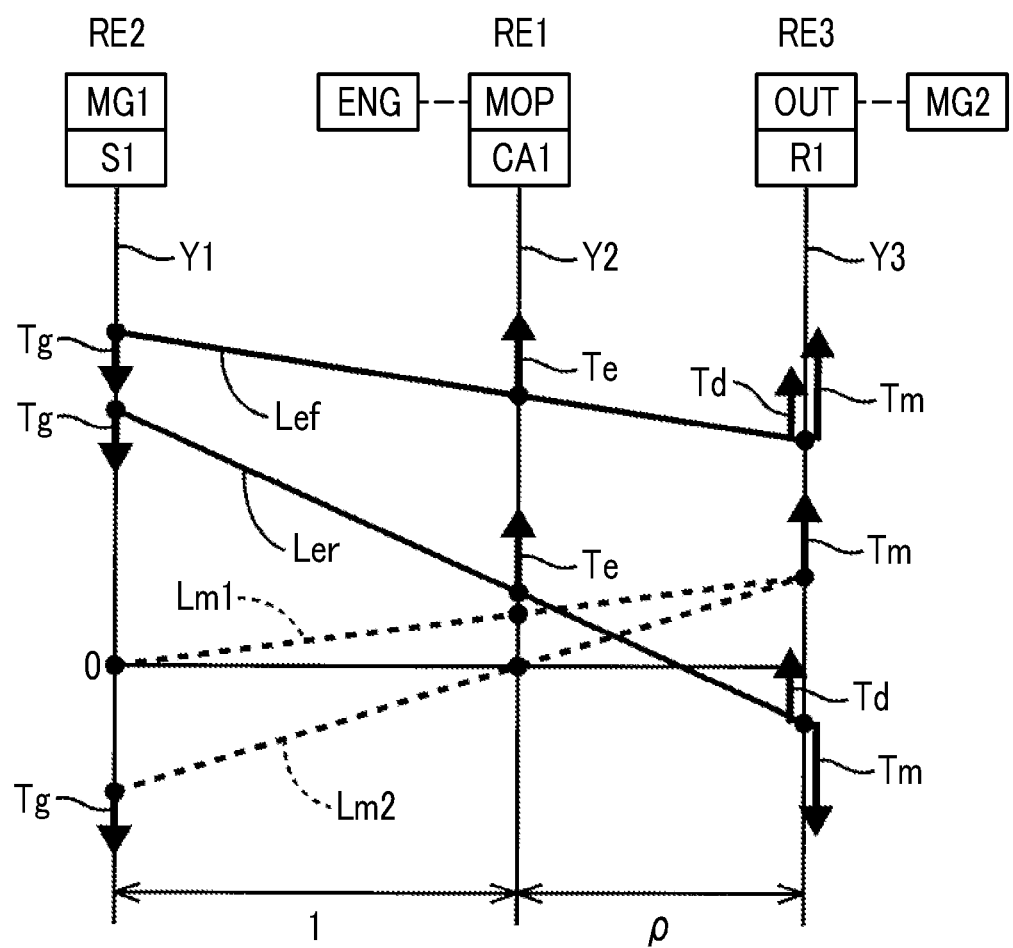
FIG. 3 is an alignment chart showing a relative relationship between rotation speeds of respective rotating elements in a differential unit illustrated in FIG. 1.

FIG. 3 is an alignment chart showing a relative relationship between rotation speeds of respective rotating elements in the differential unit 60 illustrated in FIG. 1. In FIG. 3, three vertical lines Y1, Y2, and Y3 correspond to three rotating elements of the second planetary gear mechanism 82 constituting the differential unit 60. The vertical line Y1 represents the rotation speed of the sun gear S1, which is the second rotating element RE2 to which the first rotating machine MG1 (see "MG1" shown in FIG. 3) is connected. The vertical line Y2 represents the rotation speed of the carrier CA1, which is the first rotating element RE1 to which the engine 12 (see "ENG" shown in FIG. 3) is connected through the transmission unit 58. The vertical line Y3 represents the rotation speed of the ring gear R1, which is the third rotating element RE3, which is integrally connected to the drive gear 74 (see "OUT" shown in FIG. 3). The second rotating machine MG2 (see "MG2" shown in FIG. 3) is connected to the driven gear 62 that meshes with the drive gear 74 through the reduction gear 70 and the like. The intervals between the vertical lines Y1, Y2, and Y3 are determined according to the gear ratio $\rho$ of the second planetary gear mechanism 82 (=the number of teeth of the sun gear S1/the number of teeth of the ring gear R1). When the space between the sun gear S1 and the carrier CA1 is set to an interval corresponding to "1" in the relationship between the vertical axes of the alignment chart, the space between the carrier CA1 and the ring gear R1 is set to an interval corresponding to the gear ratio $\rho$.

A mechanical oil pump (see "MOP" shown in FIG. 3) provided in the vehicle 10 is connected to the carrier CA1. The mechanical oil pump is driven by the rotation of the carrier CA1, and supplies oil used for the engagement operation of the clutch C1 and the brake B1, and the cooling. When the rotation of the carrier CA1 is stopped, oil is supplied by an electric oil pump (not shown) provided in the vehicle 10.

A solid line Lef in FIG. 3 indicates an example of relative speeds of respective rotating elements in forward traveling in an HV traveling (=hybrid traveling) mode, where the HV traveling mode is a traveling mode in which HV traveling is possible such that traveling is performed using at least the engine 12 as a power source. The solid line Ler in FIG. 3 indicates an example of the relative speeds of respective rotating elements in backward traveling in the HV traveling mode.

In the HV traveling mode, in the second planetary gear mechanism 82, for example, when the MG1 torque Tg, which is a negative torque by the first rotating machine MG1 and a reaction torque with respect to the engine torque Te that is the positive torque input to the carrier CA1 through the transmission unit 58, is input to the sun gear S1, a positive torque Td [Nm] which is directly transmitted to the engine appears in the ring gear R1. For example, in a case where the clutch C1 is engaged and the brake B1 is released and the transmission unit 58 is in the direct coupled condition of the gear ratio "1.0", when the MG1 torque Tg $\{=-\rho/(1+\rho) \times Te\}$, which is the reaction torque with respect to the engine torque Te input to the carrier CAL is input to the sun gear S1, the torque Td $\{=Te/(1+\rho)=-(1/\rho) \times Tg\}$ which is directly transmitted to the engine appears in the ring gear R1. Then, according to the request driving force Pwdem [N], the total torque of the torque Td directly transmitted to the engine and the MG2 torque Tm transmitted to the driven gear 62 can be transmitted to the drive wheels 16 as the drive torque Tw[Nm] of the vehicle 10.

The first rotating machine MG1 functions as a generator when negative torque is generated by positive rotation. The battery 54 is charged with the generated electric power Wg [W] of the first rotating machine MG1, and the second rotating machine MG2 consumes the generated electric power. The second rotating machine MG2 outputs the MG2 torque Tm by using all or some of the generated electric power Wg or by using the electric power from the battery 54 in addition to the generated electric power Wg. The MG2 torque Tm at the time of forward traveling is a powering torque that is a positive torque of positive rotation, and the MG2 torque Tm at the time of backward traveling is a powering torque that is a negative torque of negative rotation.

The differential unit 60 can be operated as an electric continuously variable transmission. For example, in the HV traveling mode, the operating state of the first rotating machine MG1 is controlled based on the output rotation speed No [rpm], which is the rotation speed of the drive gear 74 constrained by the rotation of the drive wheels 16, and thus the rotation speed of the first carrier CA1 is increased or decreased when the rotation speed of the first rotating machine MG1, that is, the rotation speed of the sun gear S1 is increased or decreased. Since the carrier CA1 is connected to the engine 12 through the transmission unit 58, the engine speed Ne [rpm] of the engine, which is the engine speed of the engine 12, is increased or decreased by increasing or decreasing the rotation speed of the carrier CA1. Therefore, in HV traveling, it is possible to perform control for setting the engine operating point OPeng to an efficient operating point. This type of hybrid is called a machine split type or a split type. The first rotating machine MG1 is a rotating machine capable of controlling the engine speed Ne. The engine operating point OPeng is an operating point of the engine 12 represented by the engine speed Ne and the engine torque Te. The engine operating point OPeng corresponds to the "engine operating point" in the disclosure.

A dashed line Lm1 of FIG. 3 indicates an example of relative speeds of respective rotating elements in forward traveling, in a single drive EV traveling mode in which EV traveling (motor traveling) using just the second rotating machine MG2 as a power source can be performed in a state where the operation of the engine 12 is stopped. In the single drive EV traveling mode, the clutch C1 and the brake B1 are both released, and the transmission unit 58 is in the neutral state, and thus the differential unit 60 is also in the neutral state. In this state, the MG2 torque Tm can be transmitted to the drive wheels 16 as drive torque Tw of the vehicle 10. In the single drive EV traveling mode, for example, in order to reduce drag loss or the like in the first rotating machine MG1, the first rotating machine MG1 is maintained at zero rotation. For example, even if control is performed to maintain the first rotating machine MG1 at zero rotation, since the differential unit 60 is in the neutral state, the drive torque Tw is not affected.

A dashed line Lm2 of FIG. 3 indicates an example of relative speeds of respective rotating elements in forward traveling, in a dual drive EV traveling mode in which the EV traveling using both the first rotating machine MG1 and the second rotating machine MG2 as power sources can be performed in a state where the operation of the engine 12 is stopped. In the dual drive EV traveling mode, the clutch C1 and the brake B1 are both engaged to stop the rotation of each of rotating elements of the first planetary gear mechanism 80, and thus the carrier CA1 is stopped to zero rotation. In this state, the MG1 torque Tg and the MG2 torque Tm can be transmitted to the drive wheels 16 as drive torque Tw of the vehicle 10.

Figure 4:
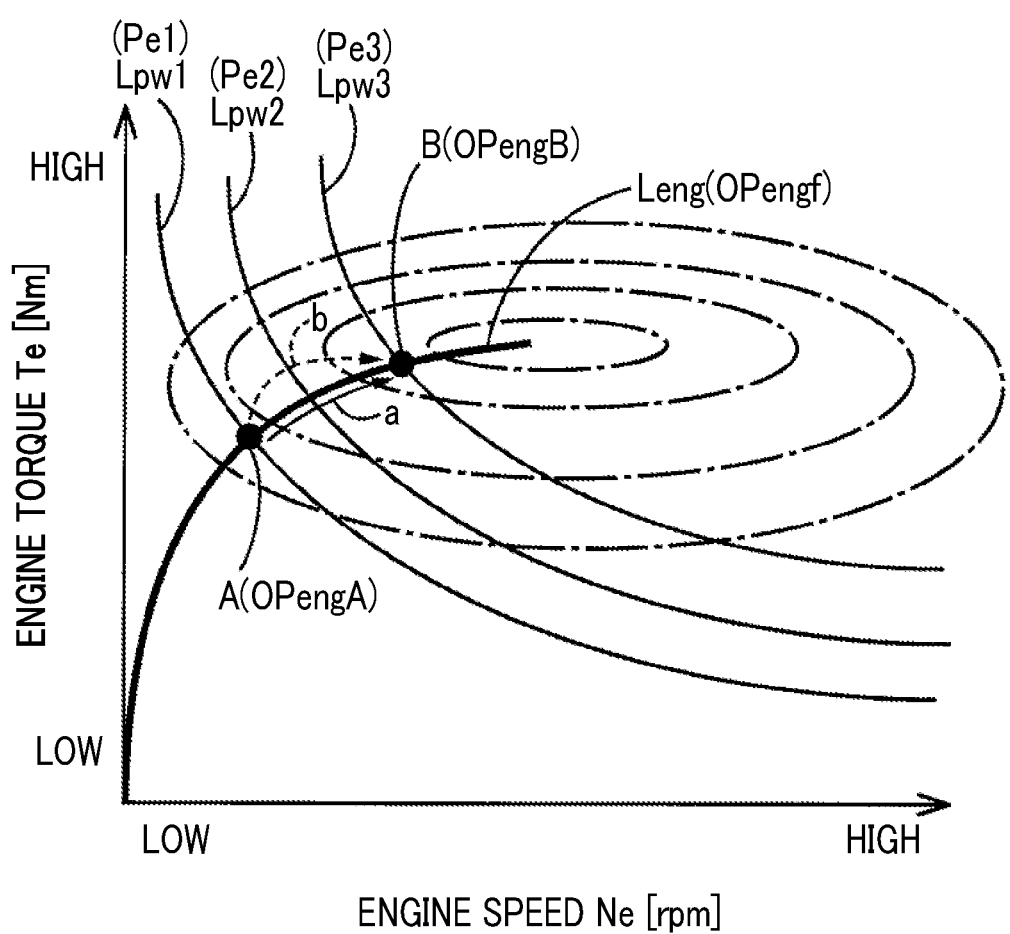
FIG. 4 is a diagram illustrating an example of optimum engine operating points on two-dimensional coordinates using an engine speed and an engine torque as variables.

FIG. 4 is a diagram illustrating an example of optimum engine operating points OPengf on two-dimensional coordinates using the engine speed Ne and the engine torque Te as variables. In FIG. 4, a maximum efficiency line Leng indicates a group of optimum engine operating points OPengf. The equal engine output lines (equal power lines) Lpw1, Lpw2, and Lpw3 indicate an example when the request engine outputs (request engine powers) Pedem [W] are the request engine outputs Pe1, Pe2, Pe3, respectively. Point A is an engine operating point OPengA when the request engine output Pe1 is implemented on the optimum engine operating point OPengf, and point B is an engine operating point OPengB when the request engine output Pe3 is implemented on the optimum engine operating point OPengf. The points A and B are also target values of the engine operating points OPeng represented by the target engine speed Netgt and the target engine torque Tetgt, that is, the target engine operating points OPengtgt. When the target engine operating point OPengtgt is changed from the point A to the point B, for example, by an increase in the accelerator operation amount θacc [%] (for example, an increase in the accelerator operation amount θacc based on the accelerator pedal depressing operation (not shown) by the driver), control is performed such that the engine operating point OPeng is changed on a path a passing on the maximum efficiency line Leng, or such that the engine operating point OPeng is changed on a path b that temporarily leaves the maximum efficiency line Leng. It is noted that the target engine operating point OPengtgt corresponds to the "target operating point" in the disclosure. The accelerator operation amount θacc indicates the amount of acceleration requested by the driver, and corresponds to the "accelerator operation amount" in the disclosure.

Although not shown in FIG. 4, strictly speaking, in the engine 12 having the turbocharger 18, the turbocharging pressure Pchg is stored to in advance as a variable of the optimal engine operating point OPengf at which the fuel efficiency is maximized, in addition to the engine speed Ne and the engine torque Te. The turbocharging pressure Pchg when the request engine output Pedem is implemented on the optimum engine operating point OPengf is the target turbocharging pressure Pchgtgt [Pa].

Figure 5:
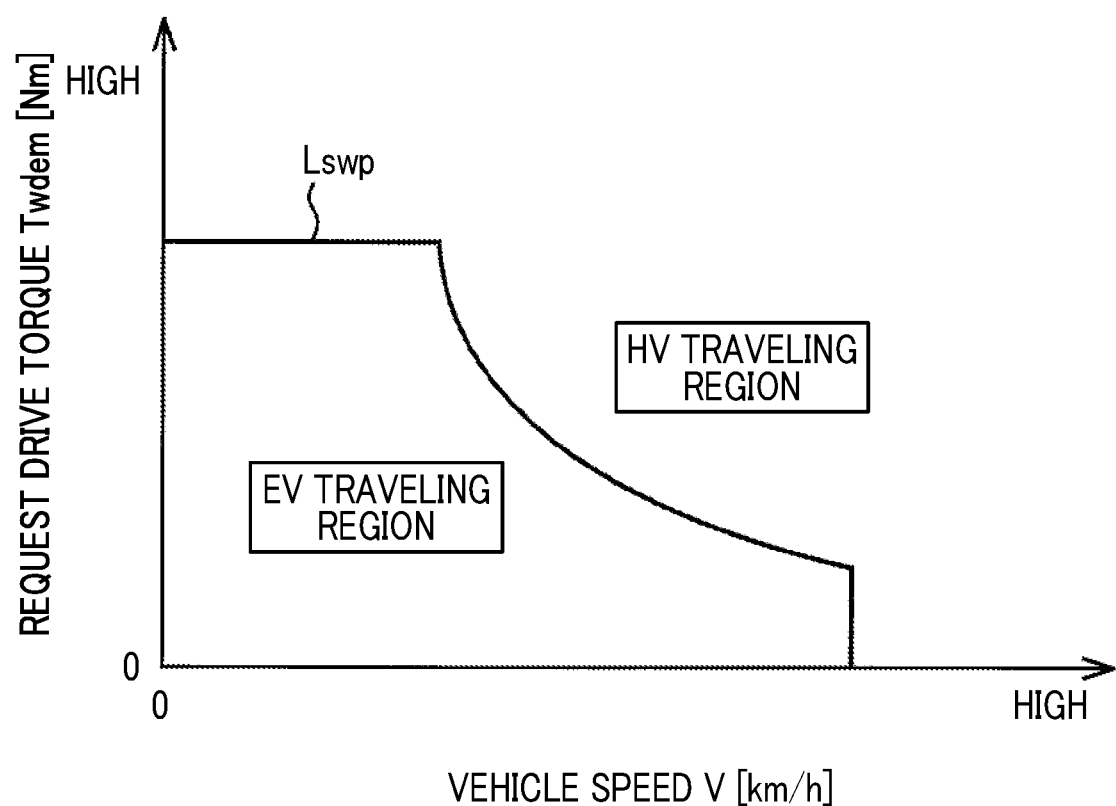
FIG. 5 is a diagram illustrating an example of a power source switching map used for switching control between EV traveling and HV traveling.

FIG. 5 is a diagram illustrating an example of a power source switching map used for switching control between the EV traveling and the HV traveling. In FIG. 5, a solid line Lswp is a boundary line between an EV traveling region and an HV traveling region for switching between the EV traveling and the HV traveling. A region where the vehicle speed V [km/h] is relatively low and the request drive torque Twdem [Nm] is relatively low (that is, the request driving force Pwdem is relatively small) is predetermined in the EV traveling region. A region where the vehicle speed V is relatively high or the request drive torque Twdem is relatively high (that is, the request driving force Pwdem is relatively large) is predetermined in the HV traveling region. It is noted that when the state of charge SOC [%] of the battery 54 to be described later is lower than a predetermined value or when the engine 12 needs to be warmed up, the EV traveling region in FIG. 5 may be changed to the HV traveling region. The predetermined value is a predetermined threshold for determining whether or not the state of charge SOC is a value at which the battery 54 needs to be charged through forcible start of the engine 12.

FIG. 6 is an engagement operation table for describing a relationship between each traveling mode and a combination of operating states of the clutch C1 and the brake B1 used for the traveling mode. In FIG. 6, "O" mark indicates the engagement state, "blank" indicates the release state, and "Δ" mark indicates that one of the clutch C1 and the brake B1 is in the engagement state when the engine brake is used together that brings the engine 12 in the rotation-stopped state into the rotation state. Further, "G" mark indicates that the first rotating machine MG1 mainly functions as a generator, and "M" mark indicates that each of the first rotating machine MG1 and the second rotating machine MG2 mainly functions as a motor when during driving, and mainly functions as a generator during regeneration. The vehicle 10 can selectively implement the EV traveling mode and the HV traveling mode as the traveling mode. The EV traveling mode has two modes: a single drive EV traveling mode and a dual drive EV traveling mode.

The single drive EV traveling mode is implemented in a state where both the clutch C1 and the brake B1 are released. In the single drive EV traveling mode, since the clutch C1 and the brake B1 are released, the transmission unit 58 is in the neutral state. When transmission unit 58 is set to the neutral state, the differential unit 60 is set to the neutral state in which the reaction torque of MG1 torque Tg is not taken in the carrier CA1 connected to the ring gear R0. In this state, the electronic control unit 100 causes the second rotating machine MG2 to output the MG2 torque Tm for traveling (see the dashed line Lm1 shown in FIG. 3). In the single drive EV traveling mode, it is also possible to rotate the second rotating machine MG2 reversely with respect to forward traveling to travel backward.

In the single drive EV traveling mode, the ring gear R0 is rotated with the carrier CA1, but since the transmission unit 58 is in the neutral state, the engine 12 is not rotated and is stopped at zero rotation. Therefore, when the regenerative control is performed by the second rotating machine MG2 during traveling in the single drive EV traveling mode, a large regenerative amount can be obtained. When the battery 54 is fully charged and regenerative energy cannot be obtained during traveling in the single drive EV traveling mode, it is conceivable to use an engine brake together. When the engine brake is used together, the brake B1 or the clutch C1 is engaged (see "WITH ENGINE BRAKE" shown in FIG. 6). When the brake B1 or the clutch C1 is engaged, the engine 12 is brought into the rotated state, and the engine brake is applied.

The dual drive EV traveling mode is implemented in a state where the clutch C1 and the brake B1 are both engaged. In the dual drive EV traveling mode, the rotation of each rotating element of the first planetary gear mechanism 80 is stopped by the engagement of the clutch C1 and the brake B1, the engine 12 is in a stopped state at zero rotation, and the rotation of the carrier CA1 connected to the ring gear R0 is stopped. When the rotation of the carrier CA1 is stopped, since the reaction torque of the MG1 torque Tg can be obtained in the carrier CA1, the MG1 torque Tg can be mechanically output from the ring gear R1 and transmitted to the drive wheels 16. In this state, the electronic control unit 100 causes the first rotating machine MG1 and the second rotating machine MG2 to output the MG1 torque Tg and the MG2 torque Tm for traveling, respectively (see the dashed line Lm2 shown in FIG. 3). In the dual drive EV traveling mode, it is also possible to cause both the first rotating machine MG1 and the second rotating machine MG2 to rotate reversely with respect to forward traveling to travel backward.

The low state of the HV traveling mode is implemented in a state where the clutch C1 is engaged and a state where the brake B1 is released. In the low state of the HV traveling mode, since the clutch C1 is engaged, the rotating elements of the first planetary gear mechanism 80 are integrally rotated, and the transmission unit 58 is brought into a direct coupled condition. Therefore, the rotation of the engine 12 is transmitted at a constant speed from the ring gear R0 to the carrier CA1. The high state of the HV traveling mode is implemented when the brake B1 is engaged and the clutch C1 is released. In the high state of the HV traveling mode, the rotation of the sun gear S0 is stopped by the engagement of the brake B1, and the transmission unit 58 is brought into an overdrive condition. Therefore, the rotation of the engine 12 is increased and transmitted from the ring gear R0 to the carrier CA1. In the HV traveling mode, the electronic control unit 100 outputs the MG1 torque Tg, which is a reaction torque to the engine torque Te, by the power generation of the first rotating machine MG1, and outputs the MG2 torque Tm from the second rotating machine MG2 by the generated electric power Wg of the first rotating machine MG1 (see the solid line Lef shown in FIG. 3). In the HV traveling mode, for example, in the low state of the HV traveling mode, it is also possible to rotate the second rotating machine MG2 reversely with respect to the forward traveling to travel backward (see the solid line Ler shown in FIG. 3). In the HV traveling mode, it is possible to further add the MG2 torque Tm using the electric power from the battery 54 for traveling. In the HV traveling mode, for example, when the vehicle speed V is relatively high and the request drive torque Twdem is relatively low, the high state in the HV traveling mode is established.

Returning to FIG. 1, the vehicle 10 further includes the electronic control unit 100 as a controller including a control device of the vehicle 10 related to control of the engine 12, the first rotating machine MG1, the second rotating machine MG2, and the like. The electronic control unit 100 includes, for example, a so-called microcomputer having a CPU, a RAM, a ROM, an input/output interface, and the like. The CPU performs various controls of the vehicle 10 by using a temporary storage function of the RAM and performing signal processing according to a program stored in the ROM in advance. The electronic control unit 100 may include computers for engine control, rotating machine control, hydraulic control, and the like, as necessary. The electronic control unit 100 corresponds to the "control device" in the disclosure.

The electronic control unit 100 receives various signals or the like (for example, the turbocharging pressure Pchg, the throttle valve opening degree θth, the engine speed Ne, the output rotation speed No corresponding to the vehicle speed V, the MG1 rotation speed Ng [rpm] which is the rotation speed of the first rotating machine MG1, the MG2 rotation speed Nm [rpm] which is the rotation speed of second rotating machine MG2, the accelerator operation amount θacc which is the accelerator operation amount of the driver indicating the magnitude of accelerator operation of the driver, the battery temperature THbat [° C.] of battery 54, the battery charge/discharge current Ibat [mA], the battery voltage Vbat [V], and the like) based on detection values by various sensors, or the like, provided in the vehicle 10 (for example, a turbocharging pressure sensor 40, a throttle valve opening degree sensor 44, an engine speed sensor 88, an output rotation speed sensor 90, an MG1 rotation speed sensor 92, an MG2 rotation speed sensor 94, an accelerator operation amount sensor 96, an battery sensor 98, and the like).

From the electronic control unit 100, various command signals (for example, an engine control command signal Se that is a command signal controlling the engine 12, a rotating machine control command signal Smg that is a command signal controlling the first rotating machine MG1 and the second rotating machine MG2, a hydraulic control command signal Sp that is a command signal controlling each operating state of clutch C1 and brake B1, and the like) are output to respective devices (for example, the engine control device 50, the inverter 52, the hydraulic control circuit 84, and the like) provided in the vehicle 10.

The electronic control unit 100 functionally includes a target operating point setting unit 102, a smoothing factor setting unit 104, and a drive controller 106.

The target operating point setting unit 102 applies the actual accelerator operation amount θacc and the vehicle speed V to a relationship (for example, a driving force map) between the accelerator operation amount θacc and the vehicle speed V and the request drive torque Twdem, which is stored in advance (that is, determined in advance) experimentally or by design to calculate the request drive torque Twdem that is the drive torque Tw requested for the vehicle 10. The request drive torque Twdem is the request driving force Pwdem at the vehicle speed V at that time. The driving force map may use the output rotation speed No or the like instead of the vehicle speed V.

The target operating point setting unit 102 sets, based on the request driving force Pwdem, the target engine operating point OPengtgt through the slow change process for obtaining the engine output Pe that slowly changes with respect to the request engine output Pedem implementing the request driving force Pwdem. That is, in setting the target engine operating point OPengtgt for obtaining the request engine output Pedem, the engine operating point OPeng is set such that the engine output Pe slowly changes through the slow change process. Note that the engine speed Ne and the engine torque Te representing the engine operating point OPeng are subjected to the slow change process, but the turbocharging pressure Pchg is not subjected to the slow change process due to poor response compared to the engine speed Ne and the engine torque Te.

The changing rate at which the engine output Pe at which the slow change process is performed changes from the current state to the request engine output Pedem is delayed as compared with the case where the slow change process is not performed. That is, the slow change process is a process for slowly changing the engine output Pe as compared to the case where the slow change process is not performed. The changing rate of the engine output Pe when the slow change process is not performed is set in advance experimentally or by design such that the driver's feeling of acceleration (increase in the vehicle speed V) follows the increase in the engine speed Ne when the response of the turbocharging pressure Pchg of the engine 12 during the vehicle acceleration is the slowest. When the response of the turbocharging pressure Pchg of the engine 12 is fast during vehicle acceleration, a so-called rubber band feel is likely to occur. The rubber band feel is an uncomfortable feeling that the engine speed Ne increases during the vehicle acceleration but the accompanying a feeling of acceleration does not follow. Specifically, the slow change process is implemented by, for example, slowly changing the driving force Pw of the vehicle 10 from the current state to the request driving force Pwdem, or slowly changing the engine output Pe of the vehicle 10 from the current state to the request engine output Pedem. The slow change process is performed based on the "smoothing factor $\tau$" to be described later.

The MG1 torque Tg is calculated, for example, in feedback control under which the first rotating machine MG1 is operated such that the engine speed Ne of the engine is the target engine speed Netgt. The MG2 torque Tm is calculated to obtain the request drive torque Twdem, for example, in combination of the drive torque Tw and the MG2 torque Tm based on the torque Td directly transmitted to the engine. Since the ratio of the MG2 torque Tm to the drive torque Tw is separately set by a torque assist rate Rasst to be described later, the target engine torque Tetgt (and the MG2 torque Tm in that case) is set so as to achieve the torque assist rate Rasst. The optimum engine operating point OPengf is predetermined, for example, as the engine operating point OPeng at which the total fuel efficiency of the vehicle 10 is in its best considering the charge/discharge efficiency of the battery 54 in addition to the fuel efficiency of the engine 12 alone, when the request engine output Pedem is implemented. The target engine speed Netgt is a target value of the engine speed Ne, the target engine torque Tetgt is a target value of the engine torque Te, and the engine output Pe is the power output from the engine 12. As described above, the vehicle 10 is a vehicle that controls the MG1 torque Tg, which is the reaction torque of the first rotating machine MG1, which is input to the sun gear S1 of the differential unit 60, such that the engine speed Ne is the target engine speed Netgt. The engine operating point OPeng is set to the target engine operating point OPengtgt by controlling the engine 12 and the differential unit 60 that is a continuously variable transmission.

Since the vehicle speed V is increased with the engine speed Ne increasing during vehicle acceleration by slowly changing the engine output Pe, the rubber band feel is suppressed and the driving feeling is improved.

In the engine 12 having the turbocharger 18, when the amount of change $\Delta Pchg$ [Pa] in the turbocharging pressure is large during vehicle acceleration, that is, when the response of the turbocharging pressure Pchg (the time until the turbocharging operation including the so-called turbo lag works) is fast, a rubber band feel is likely to occur. On the other hand, when the amount of change $\Delta Pchg$ in the turbocharging pressure during vehicle acceleration is small, that is, when the response of the turbocharging pressure Pchg is slow, the rubber band feel is unlikely to occur. However, there is a possibility that the driving feeling may be deteriorated due to the feeling of sluggish caused by the combination of the response delay of the turbocharging pressure Pchg with the slow change process. The amount $\Delta Pchg$ of change in the turbocharging pressure is an amount of change in the turbocharging pressure Pchg per a predetermined time $\Delta t$ based on an increase in the accelerator operation amount Oacc during vehicle acceleration, and means a changing rate of the turbocharging pressure Pchg. The predetermined time $\Delta t$ is, for example, a time interval at which a flowchart of FIG. 10 to be described later is repeatedly executed.

The smoothing factor setting unit 104 sets the smoothing factor $\tau$ used for the slow change process. The smoothing factor $\tau$ represents the degree of delay in comparing a changing rate at which the current engine operating point OPeng (hereinafter, referred to as "current engine operating point OPeng_c") is changed toward the target engine operating point OPengtgt in the slow change process with the changing rate when the slow change process is not performed. The smoothing factor $\tau$ may be defined, for example, as the ratio of rising rates, which is the ratio of the "rising rate when the slow change process is not performed" to the "rising rate when the slow change process is performed", where the rising rate is an amount of increase per unit time of the engine speed Ne or the engine output Pe during a period of changing from the current engine operating point OPeng_c to the target engine operating point OPengtgt. That is, in the rate processing for changing the engine speed Ne or the engine output Pe at a predetermined rising rate when the slow change process is performed, the smoothing factor τ is the reciprocal of the ratio of the "predetermined rising rate when the slow change process is performed" to the "rising rate when the slow change process is not performed". It is desirable that the smoothing factor τ is a value of about "1.1" to "2.5". The smoothing factor τ may be defined, for example, as the ratio of "a change time when the slow change process is performed" to the "change time when the slow change process is not performed", where the change time is a change time in which the current engine operating point OPeng_c is changed toward the target engine operating point OPengtgt by a predetermined engine speed Ne. The average value of the smoothing factor τ used in the slow change process in FIG. 11 to be described below is a change time ratio (=$T_1/T_0$) of "the change time $T_1$ when the slow change process is performed" to "the change time T0 when the slow change process is not performed". In any case, the changing rate of the engine operating point OPeng decreases as the smoothing factor τ increases, and the changing rate of the engine operating point OPeng increases as the smoothing factor τ decreases. In the embodiment, the smoothing factor τ is a value larger than 1.

Figure 7:
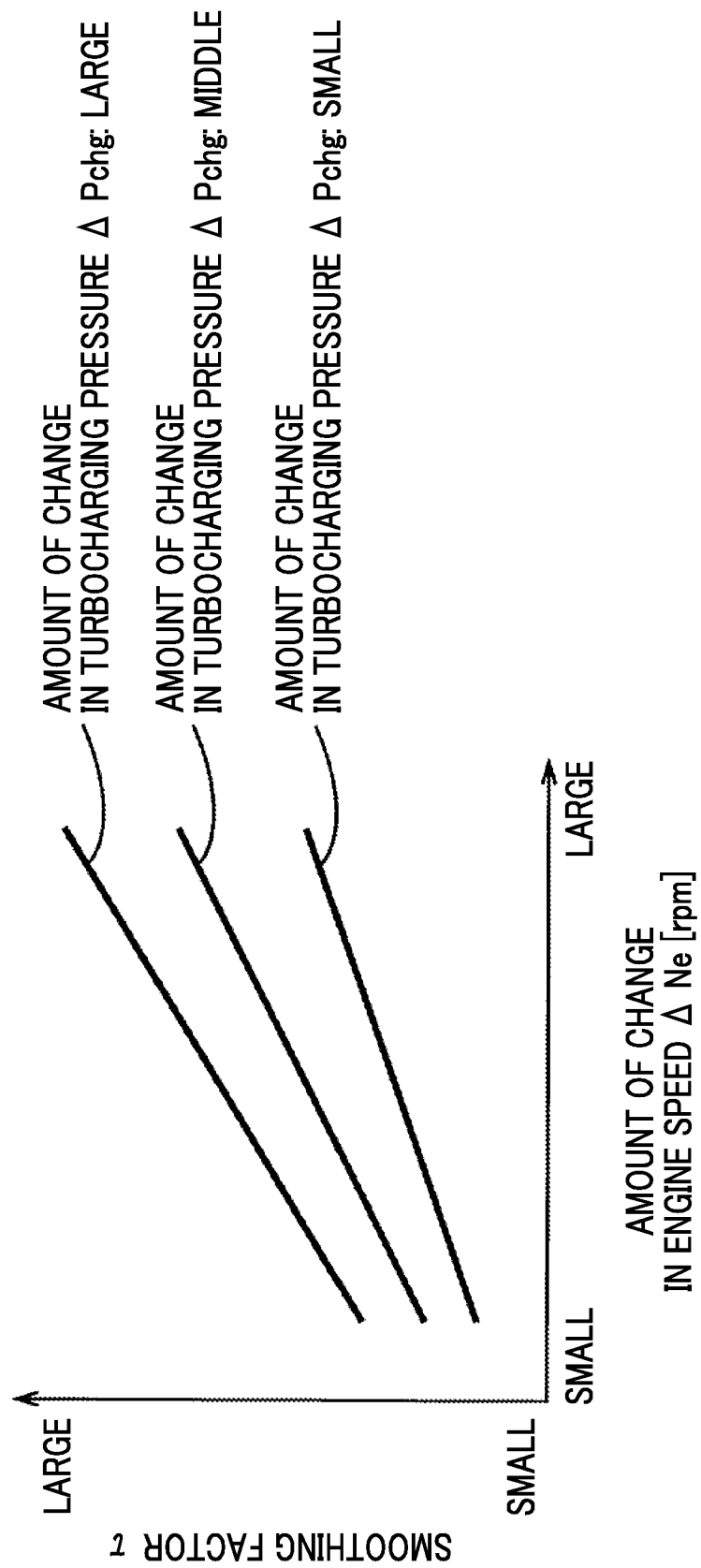
FIG. 7 is a diagram illustrating a relationship between an amount of change in an engine speed and a smoothing factor.

FIG. 7 is a diagram illustrating a relationship between the amount ΔNe [rpm] of change in the engine speed and the smoothing factor τ. The amount ΔNe of change in the engine speed is an amount of change in the engine speed Ne per a predetermined time Δt based on an increase in the accelerator operation amount θacc during vehicle acceleration, and means the changing rate of the engine speed Ne. The smoothing factor τ is set to be a smaller value when the amount ΔPchg of change in the turbocharging pressure is smaller than when the amount ΔPchg is larger. This means that when conditions other than the amount ΔPchg of change in the turbocharging pressure are the same (for example, a condition under which the amount ΔNe of change in the engine speed shown in FIG. 7 is the same), the smoothing factor τ is set to a smaller value is when the amount ΔPchg of change in the turbocharging pressure is smaller than when the amount ΔPchg is larger, and does not mean that when conditions other than the amount ΔPchg of change in the turbocharging pressure are different, the smoothing factor τ is always set to a smaller value when the amount ΔPchg of change in the turbocharging pressure is smaller than when the amount ΔPchg is larger. The smoothing factor τ is set to a larger value when the amount ΔNe of change in the engine speed is larger than when the amount ΔNe is smaller. This means that when conditions other than the amount ΔNe of change in the engine speed are the same (for example, a condition under which the amount ΔPchg of change in the turbocharging pressure shown in FIG. 7 is the same), the smoothing factor τ is set to a larger value is when the amount ΔNe of change in the engine speed is larger than when the amount ΔNe is smaller, and does not mean that when conditions other than the amount ΔNe of change in the engine speed are different, the smoothing factor τ is always set to a larger value when the amount ΔNe of change in the engine speed is larger than when the amount ΔNe is smaller.

Figure 8:
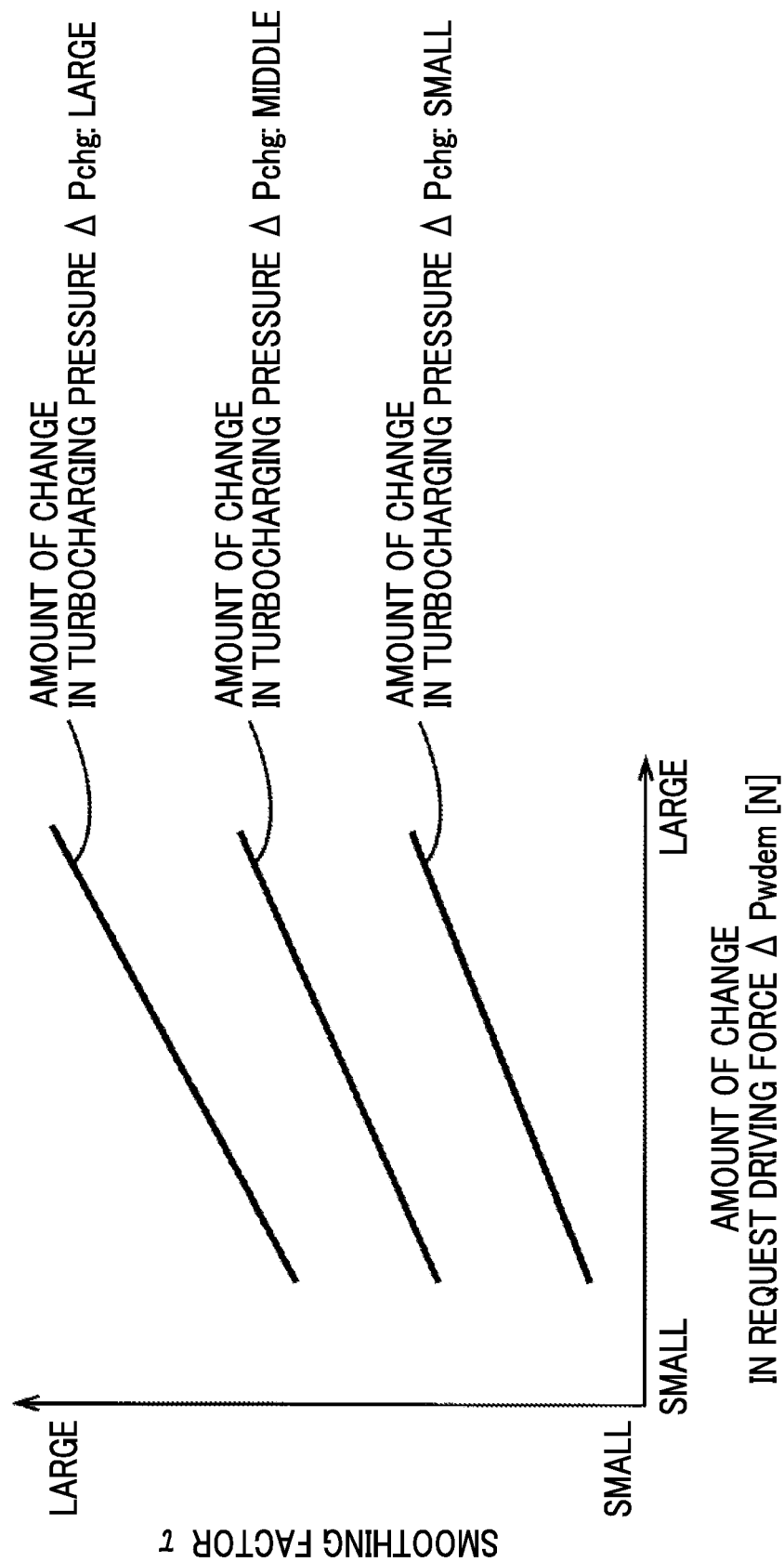
FIG. 8 is a diagram illustrating a relationship between an amount of change in a request driving force and the smoothing factor.

FIG. 8 is a diagram illustrating a relationship between the amount ΔPwdem [N] of change in the request driving force and the smoothing factor τ. The amount ΔPwdem of change in the request driving force is an amount of change in the request driving force Pwdem per a predetermined time Δt based on the increase in the accelerator operation amount θacc during vehicle acceleration, and means the changing rate of the request driving force Pwdem. As in FIG. 7 described above, the smoothing factor τ is set to be a smaller value when the amount ΔPchg of change in the turbocharging pressure is smaller than when the amount ΔPchg is larger. The smoothing factor τ is set to a larger value when the amount ΔPwdem of change in the request driving force is larger than when the amount ΔPwdem is smaller. This means that when conditions other than the amount ΔPwdem of change in the request driving force are the same (for example, a condition under which the amount ΔPchg of change in the turbocharging pressure shown in FIG. 8 is the same), the smoothing factor τ is set to a larger value when the amount ΔPwdem of change in the request driving force is larger than when the amount ΔPwdem is smaller, and does not mean that when conditions other than the amount ΔPwdem of change in the request driving force are different, the smoothing factor τ is always set to a larger value when the amount ΔPwdem of change in the request driving force is larger than when the amount ΔPwdem is smaller.

Figure 9:
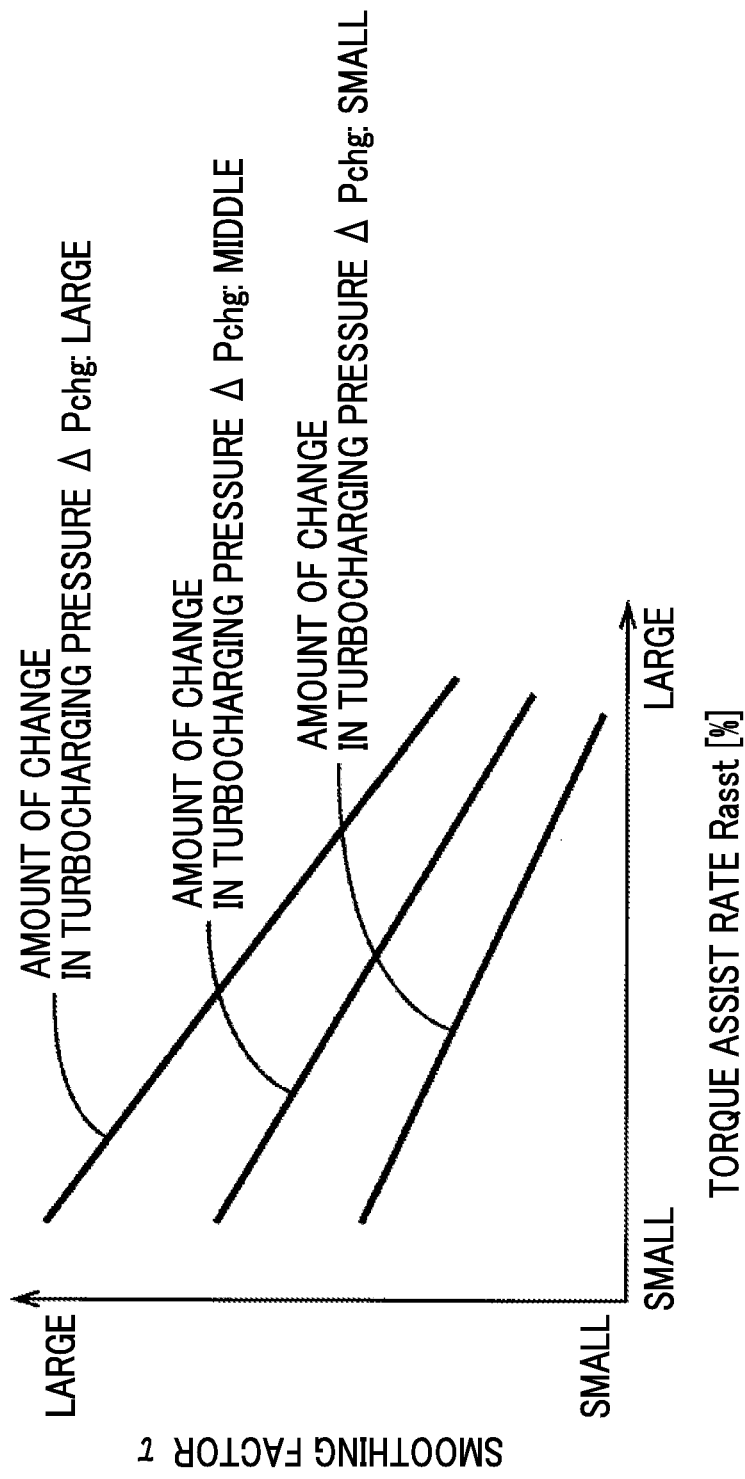
FIG. 9 is a diagram illustrating a relationship between a torque assist rate and a smoothing factor.

FIG. 9 is a diagram illustrating a relationship between the torque assist rate Rasst [%] and the smoothing factor τ. The torque assist rate Rasst is the contribution of the MG2 torque Tm, which is the output torque of the second rotating machine MG2, to the drive torque Tw, and specifically, the ratio {=Tm/(Td+Tm)} of the MG2 torque Tm to the drive torque Tw (=Td+Tm). As in FIG. 7 described above, the smoothing factor τ is set to be a smaller value when the amount ΔPchg of change in the turbocharging pressure is smaller than when the amount ΔPchg is larger. The smoothing factor τ is set to a larger value when the torque assist rate Rasst is smaller than when torque assist rate Rasst is larger. This means that when conditions other than the torque assist rate Rasst are the same (for example, a condition under which the amount ΔPchg of change in the turbocharging pressure shown in FIG. 9 is the same), the smoothing factor τ is set to a larger value is when the torque assist rate Rasst is smaller than when the torque assist rate Rasst is larger, and does not mean that when conditions other than the torque assist rate Rasst are different, the smoothing factor rate τ is always set to a larger value when the torque assist Rasst is smaller than when the torque assist rate Rasst is larger.

As described in FIGS. 7 to 9, the smoothing factor setting unit 104 sets the smoothing factor τ by using variables of the amount ΔPchg of change in the turbocharging pressure, the amount ΔNe of change in the engine speed, the amount ΔPwdem of change in the request driving force, and the torque assist rate Rasst for the slow change process. That is, the smoothing factor setting unit 104 sets the smoothing factor τ according to the amount ΔPchg of change in the turbocharging pressure, the amount ΔNe of change in the engine speed, the amount ΔPwdem of change in the request driving force and the torque assist rate Rasst.

The drive controller 106 includes a function as an engine controller, a function as a rotating machine controller, and a function as a power transmission switching unit, and by using the functions, performs a hybrid drive control on the engine 12, the first rotating machine MG1, and the second rotating machine MG2 and a shift control on the transmission provided in the power transmission device 14. The function as the engine controller is an engine control unit that controls the operation of the engine 12. The function as the rotating machine controller is a rotating machine control unit that controls the operations of the first rotating machine MG1 and the second rotating machine MG2 through the inverter 52. The function as the power transmission switching unit is a power transmission switching control unit that controls switching of the power transmission state in the transmission unit 58.

When the vehicle 10 is in the HV traveling mode, the drive controller 106 outputs an engine control command signal Se and a rotating machine control command signal Smg to implement the request driving force Pwdem by at least one power source of the engine 12, the first rotating machine MG1, and the second rotating machine MG2. The engine 12 is controlled by the engine control command signal Se such that the engine operating point OPeng is the target engine operating point OPengtgt set by the target operating point setting unit 102. The first rotating machine MG1 and the second rotating machine MG2 are controlled by the rotating machine control command signal Smg such that output torques of the first rotating machine MG1 and the second rotating machine MG2 are the MG1 torque Tg and the MG2 torque Tm in the HV traveling mode calculated by the target operating point setting unit 102, respectively. Specifically, the drive controller 106 controls the engine control device 50 and the inverter 52 such that the engine operating point OPeng is the target engine operating point OPengtgt. In the turbocharging pressure Pchg, the valve opening degree of the WGV 30 is controlled by the feedback such that the actual turbocharging pressure Pchg detected by the turbocharging pressure sensor 40 is the target turbocharging pressure Pchgtgt for achieving the request engine output Pedem.

The drive controller 106 controls each engagement operation of the clutch C1 and the brake B1 based on the established traveling mode. The drive controller 106 outputs, to the hydraulic control circuit 84, a hydraulic control command signal Sp for engaging and/or releasing each of the clutch C1 and the brake B1 such that power transmission for traveling in the established traveling mode is enabled.

Figure 10:
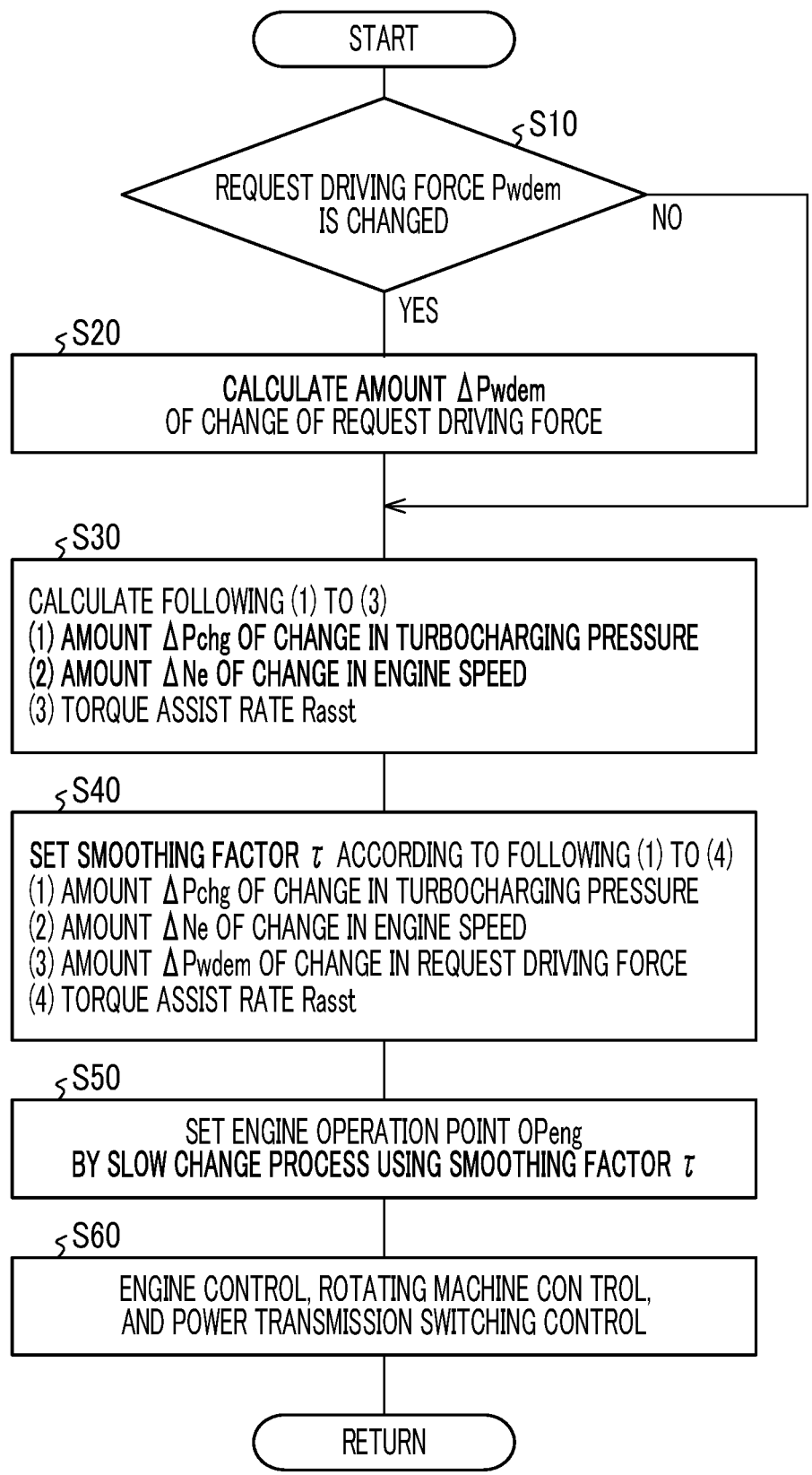
FIG. 10 is an example of a flowchart illustrating main parts of a control operation of the electronic control unit.

FIG. 10 is an example of a flowchart illustrating main parts of a control operation of the electronic control unit 100. FIG. 10 is an example when the vehicle 10 is in the HV traveling mode. The flowchart of FIG. 10 is repeatedly executed at predetermined time intervals $\Delta t$ (for example, several ms).

First, in step S10 corresponding to the function of the target operating point setting unit 102, determination is made whether or not the request driving force Pwdem is changed. Whether or not the request driving force Pwdem is changed is determined based on, for example, whether or not the accelerator operation amount $\theta$acc is changed. For example, determination is made that the request driving force Pwdem is being changed during a period in which the accelerator operation amount $\theta$acc is increasing due to the accelerator pedal depressing operation of the driver. On the other hand, for example, determination is made that the request driving force Pwdem is not changed during a period in which the accelerator pedal depressing operation of the driver ends and the accelerator operation amount $\theta$acc stops increasing to remain at a constant value (period after time t2 shown in FIG. 11). When the determination in step S10 is affirmative, step S20 is executed. When the determination in step S10 is negative, step S30 is executed. When the determination in step S10 is negative, the amount $\Delta$Pwdem of change in the request driving force is zero.

In step S20 corresponding to the function of the target operating point setting unit 102, the amount $\Delta$Pwdem of change in the request driving force is calculated. For example, the amount $\Delta$Pwdem of change in the request driving force is calculated as the difference between the request driving force Pwdem which is obtained by applying the actual accelerator operation amount $\theta$acc and the vehicle speed V to the driving force map when the flowchart is executed at this time and the request driving force Pwdem obtained by applying the actual accelerator operation amount Oacc and the vehicle speed V to the driving force map when the flowchart is executed at the previous time. Then, step S30 is performed.

In step S30 corresponding to the function of the target operating point setting unit 102, the amount $\Delta$Pchg of change in the turbocharging pressure, the amount $\Delta$Ne of change in the engine speed, and the torque assist rate Rasst are calculated. For example, the amount $\Delta$Pchg of change in the turbocharging pressure is calculated as the difference between the turbocharging pressure Pchg detected by the turbocharging pressure sensor 40 when the flowchart is executed at this time and the turbocharging pressure Pchg detected by the turbocharging pressure sensor 40 when the flowchart is executed at the previous time. For example, the engine speed Ne is calculated as the difference between the engine speed Ne detected by the engine speed sensor 88 when the flowchart is executed at this time, and the engine speed Ne detected by the engine speed sensor 88 when the flowchart is executed at the previous time. For example, the torque assist rate Rasst is calculated by the ratio $\{=Tm/(Td+Tm)\}$ of the MG2 torque Tm to the drive torque Tw $(=Td+Tm)$, but is set to a constant value in the embodiment. Then, step S40 is performed.

In step S40 corresponding to the function of the smoothing factor setting unit 104, the smoothing factor $\tau$ is set according to the amount $\Delta$Pwdem of change in the request driving force calculated in step S20, the amount $\Delta$Pchg of change in the turbocharging pressure calculated in step S30, the amount $\Delta$Ne of change in the engine speed, and the torque assist rate Rasst. Then, step S50 is performed.

In step S50 corresponding to the function of the target operating point setting unit 102, the engine operating point OPeng is set such that the engine output Pe changes slowly through the slow change process based on the smoothing factor $\tau$ set in step S40. Then, step S60 is performed.

In step S60 corresponding to the function of the drive controller 106, the engine control of the engine 12, the rotating machine control of the first rotating machine MG1 and the second rotating machine MG2, and the power transmission switching control of the transmission unit 58 are performed. Then, return is performed.

Figure 11:
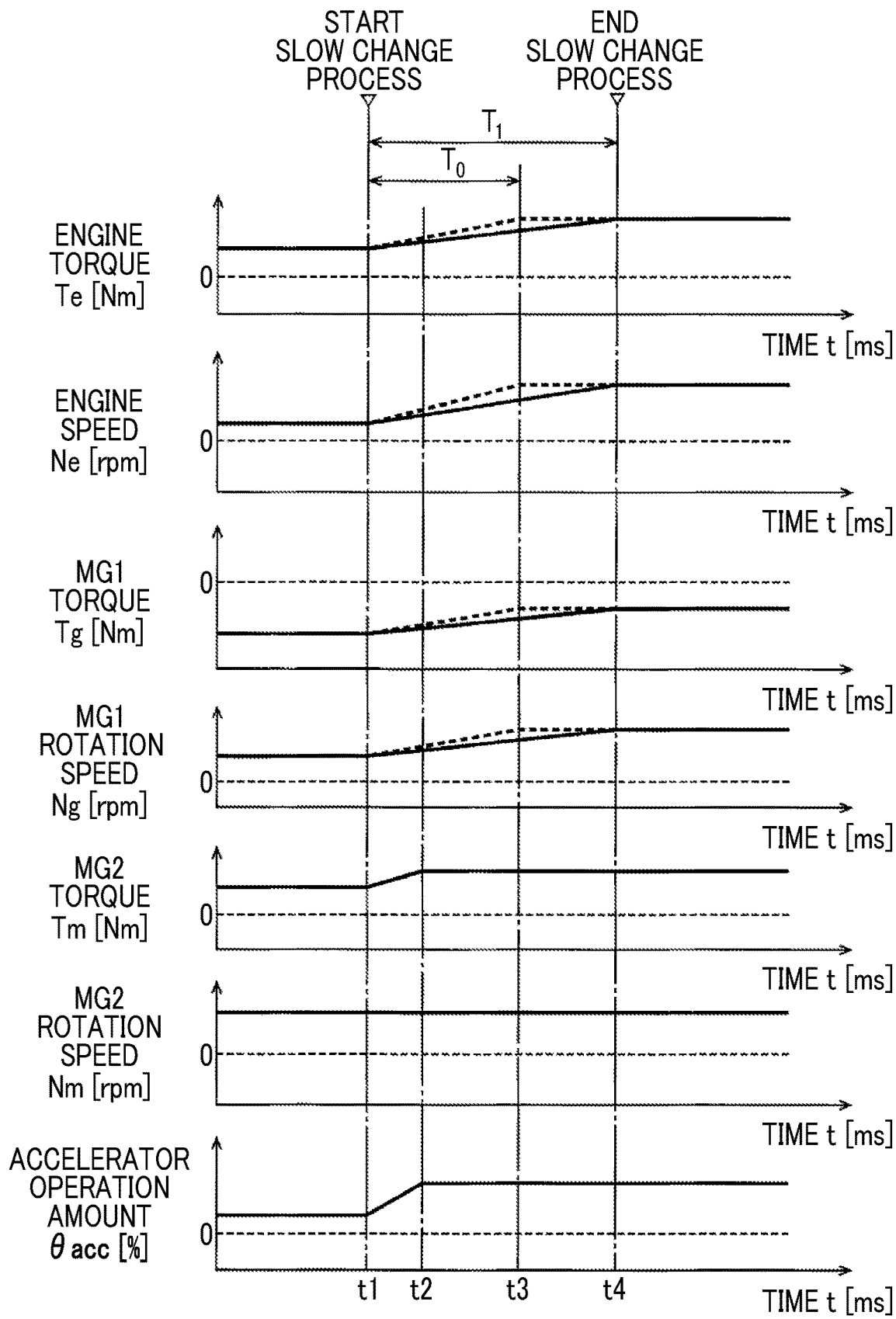
FIG. 11 is an example of a time chart when the control operation of the electronic control unit illustrated in FIG. 10 is performed.

FIG. 11 is an example of a time chart when the control operation of the electronic control unit 100 illustrated in FIG. 10 is performed.

In FIG. 11, the horizontal axis is time t [ms], and the vertical axis is engine torque Te, engine speed Ne, MG1 torque Tg, MG1 rotation speed Ng, MG2 torque Tm, MG2 rotation speed Nm, and accelerator operation amount $\theta$acc in order from the top. In FIG. 11, a time chart when the slow change process is performed is shown by a solid line, and a time chart when the slow change process is not performed is shown by a broken line, for comparison.

At time t1, for example, the accelerator pedal depressing operation of the driver starts, and the accelerator operation amount $\theta$acc starts to increase. At time t2, the accelerator pedal depressing operation by the driver ends, and the increase in the accelerator operation amount θacc stops. After time t2, accelerator operation amount θacc at time t2 is maintained.

From time t1 to time t2, the request driving force Pwdem increases due to an increase in the accelerator operation amount θacc. The amount ΔPchg of change in the turbocharging pressure, the amount ΔNe of change in the engine speed, the amount ΔPwdem of change in the request driving force and the torque assist rate Rasst (constant value) are sequentially calculated. The engine 12, the first rotating machine MG1, and the second rotating machine MG2 are controlled such that the engine operating point OPeng changes slowly by using the smoothing factor τ set according to the calculated amount ΔPchg of change in the turbocharging pressure, the amount ΔNe of change in the engine speed, the amount ΔPwdem of change in the request driving force, and the torque assist rate Rasst (constant value).

From time t2 to time t4, since the accelerator operation amount θacc has not changed, the amount ΔPwdem of change in the request driving force is zero. From time t2 to time t4, the amount ΔPchg of change in the turbocharging pressure is sequentially calculated according to the response of the turbocharging pressure Pchg. The amount ΔNe of change in the engine speed and the torque assist rate Rasst (constant value) are also sequentially calculated. The engine 12, the first rotating machine MG1, and the second rotating machine MG2 are controlled such that the engine operating point OPeng changes slowly by using the smoothing factor τ set according to the calculated amount ΔPchg of change in the turbocharging pressure, the amount ΔNe of change in the engine speed, the amount ΔPwdem (zero) of change in the request driving force, and the torque assist rate Rasst (constant value).

From time t1 to time t4, the engine torque Te and the engine speed Ne gradually increase since the engine operating point OPeng is controlled such that the engine output Pe changes slowly through the slow change process using the smoothing factor τ. At time t4, the request driving force Pwdem is achieved that corresponds to the accelerator operation amount θacc after the accelerator pedal depressing operation by the driver. Therefore, after the time t4, the engine speed Ne and the engine torque Te at the time t4 are maintained. Time t1 is the start time of the slow change process, and time t4 is the end time of the slow change process.

From time t1 to time t4, the MG1 torque Tg and the MG1 rotation speed Ng gradually increase since the MG1 torque Tg and the MG1 rotation speed Ng is controlled to be the MG1 torque Tg and the MG1 rotation speed Ng calculated such that the engine output Pe is the engine operating point OPeng that changes slowly through the slow change process using the smoothing factor τ. After time t4, MG1 torque Tg and MG1 rotation speed Ng at time t4 are maintained.

From time t1 to time t2, the MG2 torque Tm gradually increases such that the request drive torque Twdem can be slowly obtained by combining the torque Td directly transmitted to the engine with the MG2 torque Tm thereof according to the engine operating point OPeng that changes slowly through the slow change process using the smoothing factor τ. After time t2, the MG2 torque Tm at time t2 is maintained. The MG2 rotation speed Nm at time t1 is maintained from time t1 to time t4 and after time t4.

When the slow change process indicated by the broken line in FIG. 11 is not performed, at time t3, the request driving force Pwdem is achieved that corresponds to the accelerator operation amount θacc after the accelerator pedal depressing operation by the driver. Regarding the time at which the engine output Pe output from the engine 12 achieves the request driving force Pwdem, the time t3 when the slow change process is not performed is earlier than the time t4 when the slow change process performed.

According to the embodiment, (a) a target operating point setting unit 102 that calculates the request driving force Pwdem requested for the vehicle 10 based on the accelerator operation amount θacc, and set the target engine operating point OPengtgt through the slow change process for obtaining the engine output Pe that changes slowly with respect to the request engine output Pedem achieving the request driving force Pwdem, based on the calculated request driving force Pwdem, (b) a smoothing factor setting unit 104 that changes the smoothing factor τ used for the slow change process according to the amount ΔPchg of change in the turbocharging pressure in the engine 12 and sets the smoothing factor τ to a smaller value when the amount ΔPchg of change in the turbocharging pressure is smaller than when the amount ΔPchg of change in the turbocharging pressure is larger, and (c) a drive controller 106 that controls the engine 12 and the continuously variable transmission 60 such that the engine operating point OPeng is the target engine operating point OPengtgt are included. When the amount ΔPchg of change in the turbocharging pressure during vehicle acceleration is large, that is, when the response of the turbocharging pressure Pchg is fast, a rubber band feel is likely to occur. On the other hand, when the amount ΔPchg of change in the turbocharging pressure during vehicle acceleration is small, that is, when the response of the turbocharging pressure Pchg is slow, the rubber band feel is unlikely to occur. However, it is likely that the driving feeling may be deteriorated due to the feeling of sluggish caused by the combination of the response delay of the turbocharging pressure Pchg with the slow change process. As in the embodiment, when the amount ΔPchg of change in the turbocharging pressure is large, the smoothing factor τ used for the slow change process is set to a relatively large value, resulting in suppression of the rubber band feel, and when the amount ΔPchg of change in the turbocharging pressure is small, the smoothing factor used for the slow change process is set to a relatively small value, resulting in suppression of the feeling of sluggish. In this way, the rubber band feel is suppressed by the slow change process, thereby making it possible to suppress the deterioration of the driving feeling and suppress the feeling of sluggish when the amount ΔPchg of change in the turbocharging pressure is small.

According to the embodiment, the smoothing factor setting unit 104 further changes the smoothing factor τ according to the amount ΔNe of change in the engine speed, and the smoothing factor τ is set to a larger value when the amount ΔNe of change in the engine speed is larger than when the amount ΔNe is smaller. When the amount ΔNe of change in the engine speed is large, the so called rubber band feel tends to be remarkable, but when the amount ΔNe of change in the engine speed is large, the smoothing factor is set to a relatively large value, thereby suppressing the rubber band feel and thus improving the driving feeling.

According to the embodiment, the smoothing factor setting unit 104 further changes the smoothing factor τ in according to the amount ΔPwdem of change in the request driving force, and the smoothing factor τ is set to a larger value when the amount ΔPwdem of change in the request driving force is larger than when the amount ΔPwdem is smaller. When the amount ΔPwdem of change in the request driving force is large, the vehicle speed V is remarkably increased and thus the rubber band feel is likely to occur.

However, since the smoothing factor is set to a relatively large value when the amount ΔPwdem of change in the request driving force is large, the rubber band feel is suppressed and thus the driving feeling is improved.

According to the embodiment, (a) the vehicle 10 includes the second rotating machine MG2 connected to the power transmission path PT, and (b) the smoothing factor setting unit 104 changes the smoothing factor τ according to a torque assist rate Rasst of the second rotating machine MG2 and set the smoothing factor τ to be a larger value when the torque assist rate Rasst is smaller than when the torque assist rate Rasst is larger. When the torque assist rate Rasst of the second rotating machine MG2 is smaller, the change in the operating point of the engine 12 is larger when the torque assist rate is larger, and as a result, a rubber band feel is likely to occur. When the torque assist rate Rasst is smaller, the smoothing factor τ is set to a large value than when the torque assist rate Rasst is larger, and thus, the operating point of the engine 12 can be changed more slowly. In this way, the rubber band feel is suppressed and thus the driving feeling is improved.

Figure 12:
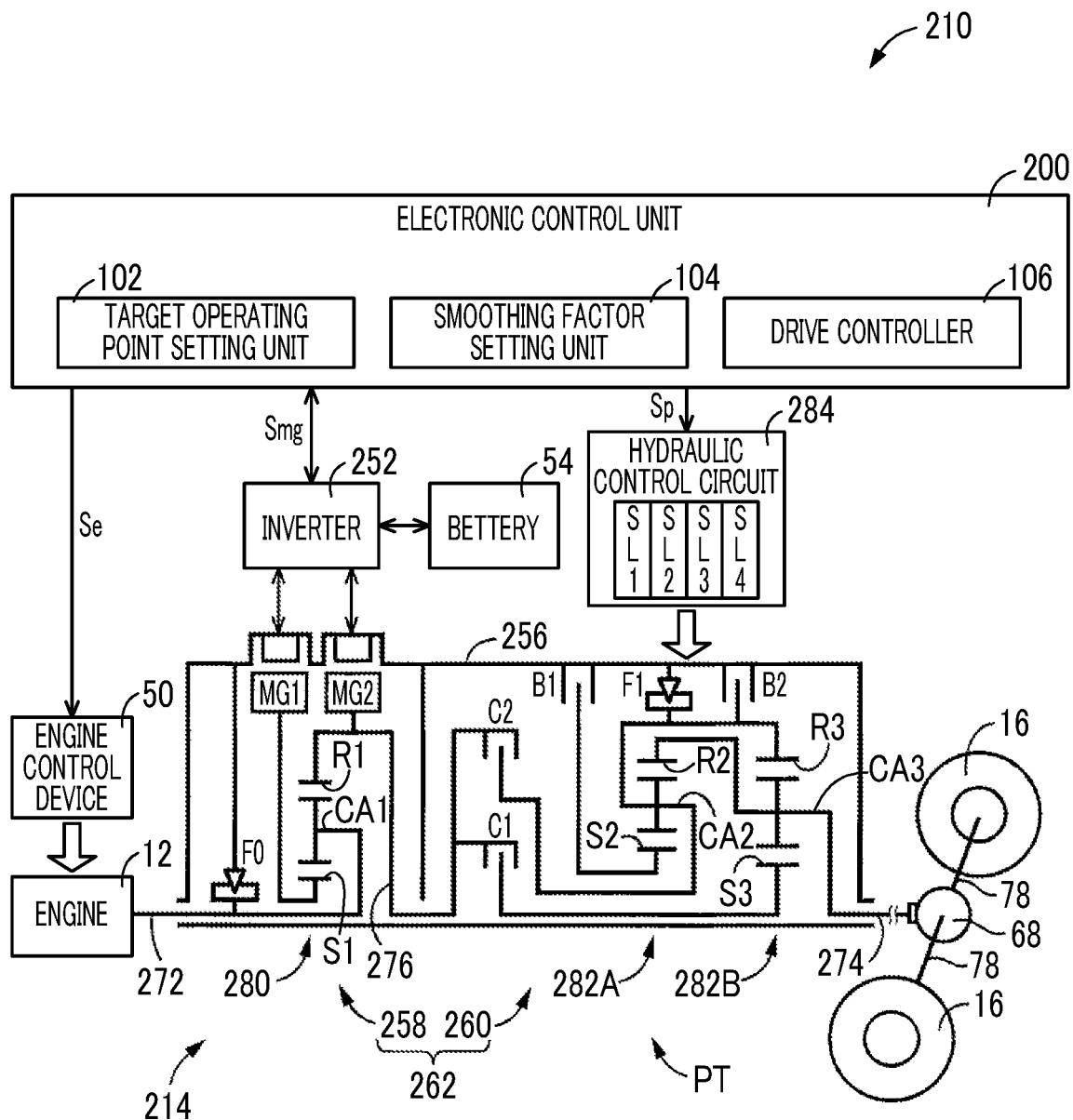
FIG. 12 is a schematic configuration diagram of a vehicle on which an electronic control unit according to a second embodiment of the disclosure is mounted, and is a functional block diagram illustrating main parts of a control functions for various controls in the vehicle.

FIG. 12 is a schematic configuration diagram of a vehicle 210 on which an electronic control unit 200 according to a second embodiment of the disclosure is mounted, and is a functional block diagram illustrating main parts of a control functions for various controls in the vehicle 210. The vehicle 210 is a hybrid vehicle including an engine 12, a first rotating machine MG1, a second rotating machine MG2, a power transmission device 214, and drive wheels 16. In the second embodiment, the same reference numerals are given to portions substantially the same in function as those in the first embodiment, and the description will be appropriately omitted.

The engine torque Te of the engine 12 is controlled by controlling an engine control device 50 provided in the vehicle 210 by an electronic control unit 200 to be described later.

Each of the first rotating machine MG1 and the second rotating machine MG2 is connected to a battery 54 provided in the vehicle 210 through an inverter 252 provided in the vehicle 210. In the first rotating machine MG1 and the second rotating machine MG2, the MG1 torque Tg and the MG2 torque Tm are controlled by controlling the inverter 252 by an electronic control unit 200 to be described later, respectively.

The power transmission device 214 includes an electric continuously variable transmission unit 258, a mechanical stepped transmission unit 260, and the like, which are arranged in series on a common axis in a case 256 as a non-rotating member mounted to the vehicle body. The continuously variable transmission unit 258 is directly or indirectly connected to the engine 12 through a damper (not shown) or the like. The stepped transmission unit 260 is connected to the output side of the continuously variable transmission unit 258. The power transmission device 214 includes a differential gear 68 connected to an output shaft 274, which is an output rotating member of the stepped transmission unit 260, a pair of axles 78 connected to the differential gear 68, and the like. In the power transmission device 214, power output from the engine 12 and the second rotating machine MG2 is transmitted to the stepped transmission unit 260. The power transmitted to the stepped transmission unit 260 is transmitted to the drive wheels 16 through the differential gear 68 and the like. The power transmission device 214 configured as described above is suitably used for a vehicle of a front engine rear drive (FR) system. The continuously variable transmission unit 258, the stepped transmission unit 260, and the like are configured substantially symmetrically with respect to the common axis, and the lower half of the axis is omitted in FIG. 12. The common axis is the axis of the crankshaft of the engine 12 and the input shaft 272 connected to the crankshaft. The continuously variable transmission unit 258, the stepped transmission unit 260, the differential gear 68, and the axle 78 in the power transmission device 214 form a power transmission path PT provided between the engine 12 and the drive wheels 16. It is noted that the second rotating machine MG2 of the embodiment corresponds to a "rotating machine" in the disclosure.

The continuously variable transmission unit 258 includes a differential mechanism 280 as a power split device mechanically splitting the power of the engine 12 into the first rotating machine MG1 and the intermediate transmission member 276 that is the output rotating member of the continuously variable transmission unit 258. The first rotating machine MG1 is a rotating machine to which the power of the engine 12 is transmitted. The second rotating machine MG2 is connected to the intermediate transmission member 276 to transmit power. Since the intermediate transmission member 276 is connected to the drive wheels 16 through the stepped transmission unit 260, the second rotating machine MG2 is a rotating machine connected to the drive wheels 16 to transmit power. The differential mechanism 280 is a differential mechanism that splits the power of the engine 12 to transmit the split power to the drive wheels 16 and the first rotating machine MG1. The continuously variable transmission unit 258 is an electric continuously variable transmission in which the differential state of the differential mechanism 280 is controlled by controlling the operating state of the first rotating machine MG1. The first rotating machine MG1 is a rotating machine capable of controlling the engine speed Ne. In addition, the continuously variable transmission unit 258 corresponds to "the continuously variable transmission" in the disclosure.

The differential mechanism 280 is a known single pinion type planetary gear device including a sun gear S1, a carrier CA1, and a ring gear R1.

The stepped transmission unit 260 is a mechanical transmission mechanism as a stepped transmission that forms a part of a power transmission path PT between the intermediate transmission member 276 and the drive wheels 16, that is, an automatic transmission that forms a part of the power transmission path PT between the differential mechanism 280 and the drive wheels 16. The intermediate transmission member 276 also functions as an input rotating member of the stepped transmission unit 260. The stepped transmission unit 260 is a known planetary gear type automatic transmission including, for example, a plurality of planetary gear devices of a first planetary gear device 282A and a second planetary gear device 282B, and a plurality of engagement devices of the clutch C1, the clutch C2, the brake B1, the brake B2, and the one-way clutch F1. Hereinafter, the clutch C1, the clutch C2, the brake B1, and the brake B2 are simply referred to as an engagement device CB unless otherwise specified. The first planetary gear device 282A is a known single pinion type planetary gear device including a sun gear S2, a carrier CA2, and a ring gear R2. The second planetary gear device 282B is a known single pinion type planetary gear device including a sun gear S3, a carrier CA3, and a ring gear R3.

The differential mechanism 280, the first planetary gear device 282A, the second planetary gear device 282B, the engagement device CB, the one-way clutch F1, the first rotating machine MG1, and the second rotating machine MG2 are connected as shown in FIG. 12. In the differential mechanism 280, the carrier CA1 functions as an input element, the sun gear S1 functions as a reaction element, and the ring gear R1 functions as an output element.

The engagement device CB is a hydraulic friction engagement device. The engagement device CB changes the engagement torque, which is the torque capacity of each engagement device CB, by the regulated engagement hydraulic pressure output from each of solenoid valves SL1 to SL4 and the like in a hydraulic control circuit 284 provided in the vehicle 210. As a result, the engagement devices CB are switched between operating states such as engagement and release.

In the stepped transmission unit 260, any one gear stage is formed among a plurality of gear stages having different gear ratios γat (=AT input rotation speed Nati [rpm]/AT output rotation speed Nato [rpm]), by switching combinations of operating states of a plurality of engagement devices CB. In the embodiment, the gear stage formed by the stepped transmission unit 260 is referred to as an AT gear stage. The AT input rotation speed Nati is the input rotation speed of the stepped transmission unit 260, has the same value as the rotation speed of the intermediate transmission member 276, and has the same value as the MG2 rotation speed Nm. The AT output rotation speed Nato is the rotation speed of the output shaft 274 that is the output rotating member of the stepped transmission unit 260, and is also the output rotation speed of a composite transmission 262, which is the entire transmission including the continuously variable transmission unit 258 and the stepped transmission unit 260.

FIG. 13 is an engagement operation table illustrating a relationship between a shift operation of the stepped transmission unit 260 illustrated in FIG. 12 and a combination of operating states of engagement devices CB used therefor. The stepped transmission unit 260 includes, as a plurality of AT gear stages, an AT first gear stage ("1st" shown in FIG. 13) to an AT fourth gear stage ("4th" shown in FIG. 13), that is, four forward AT gear stages. The gear ratio γat of the AT first gear stage is the largest, and the gear ratio γat is smaller as the AT gear stage is higher. The reverse AT gear stage ("Rev" shown in FIG. 13) is formed, for example, by engagement of the clutch C1 and engagement of the brake B2. That is, as will be described later, when the vehicle travels in the reverse direction, for example, the AT first gear stage is established. In FIG. 13, "O" mark indicates an engagement state, "Δ" mark indicates an engagement state during engine braking or coast-downshift of the stepped transmission unit 260, and "blank" indicates release. The coast downshift is, for example, among downshifts executed by decrease in the vehicle speed V during deceleration traveling of the accelerator off (accelerator operation amount θacc is zero or substantially zero), a downshift executed in the deceleration traveling state of the accelerator off.

In the stepped transmission unit 260, an AT gear stage formed according to an accelerator operation amount θacc, which is an accelerator operation amount by a driver, a vehicle speed V, and the like is switched by an electronic control unit 200 to be described later, that is, a plurality of AT gear stages is selectively formed. For example, in the shift control of the stepped transmission unit 260, shift is performed by any re-meshing of the engagement device CB, that is, a so-called clutch-to-clutch shift is performed where shift is performed by switching between engagement and release of the engagement device CB.

The vehicle 210 further includes the one-way clutch F0 (see FIG. 12). The one-way clutch F0 is a lock mechanism that can fix the carrier CA1 such that it cannot rotate. That is, the one-way clutch F0 is a lock mechanism that can fix, to the case 256, the input shaft 272 connected to the crankshaft of the engine 12 and rotating integrally with the carrier CA1. In the one-way clutch F0, one of two relatively rotatable members is integrally connected to the input shaft 272, and the other is integrally connected to the case 256. The one-way clutch F0 runs idle in a positive rotation direction, which is a rotation direction during operation of the engine 12, and automatically engages in a rotation direction opposite to the rotation direction during operation of the engine 12. Accordingly, when the one-way clutch F0 runs idle, the engine 12 is in a state capable of rotating relative to the case 256. On the other hand, when the one-way clutch F0 is engaged, the engine 12 is not in a state capable of rotating relative to the case 256. That is, the engine 12 is fixed to the case 256 by the engagement of the one-way clutch F0. Thus, one-way clutch F0 allows rotation of carrier CA1 in the positive rotation direction, which is the rotation direction during operation of the engine 12, and suppresses rotation of carrier CA1 in the negative rotation direction. That is, the one-way clutch F0 is a lock mechanism that allows rotation of the engine 12 in the positive rotation direction and suppresses rotation of the engine 12 in the negative rotation direction.

The vehicle 210 includes an electronic control unit 200 as a controller including a control device of the vehicle 210 related to control of the engine 12, the first rotating machine MG1, the second rotating machine MG2, and the like. The electronic control unit 200 has the same configuration as the electronic control unit 100 shown in the first embodiment. Various signals and the like, which are similar to those input to the electronic control unit 100, are input to the electronic control unit 200. From the electronic control unit 200, various command signals, which are similar to those output by the electronic control unit 100, are output. The electronic control unit 200 has functions similar to those of the target operating point setting unit 102, the smoothing factor setting unit 104, and the drive controller 106, similarly to the electronic control unit 100. Therefore, as in the first embodiment, when the amount ΔPchg of change in the turbocharging pressure is large, the smoothing factor τ used for the slow change process is set to a relatively large value, resulting in suppression of the rubber band feel, and when the amount ΔPchg of change in the turbocharging pressure is small, the smoothing factor used for the slow change process is set to a relatively small value, resulting in suppression of the feeling of sluggish. The engine operating point OPeng is set to the target engine operating point OPengtgt by controlling the engine 12 and the differential mechanism 280 that is a continuously variable transmission. The electronic control unit 200 corresponds to the "control device" in the disclosure.

According to the embodiment, the same effects as in the above first embodiment can be obtained.

Figure 14:
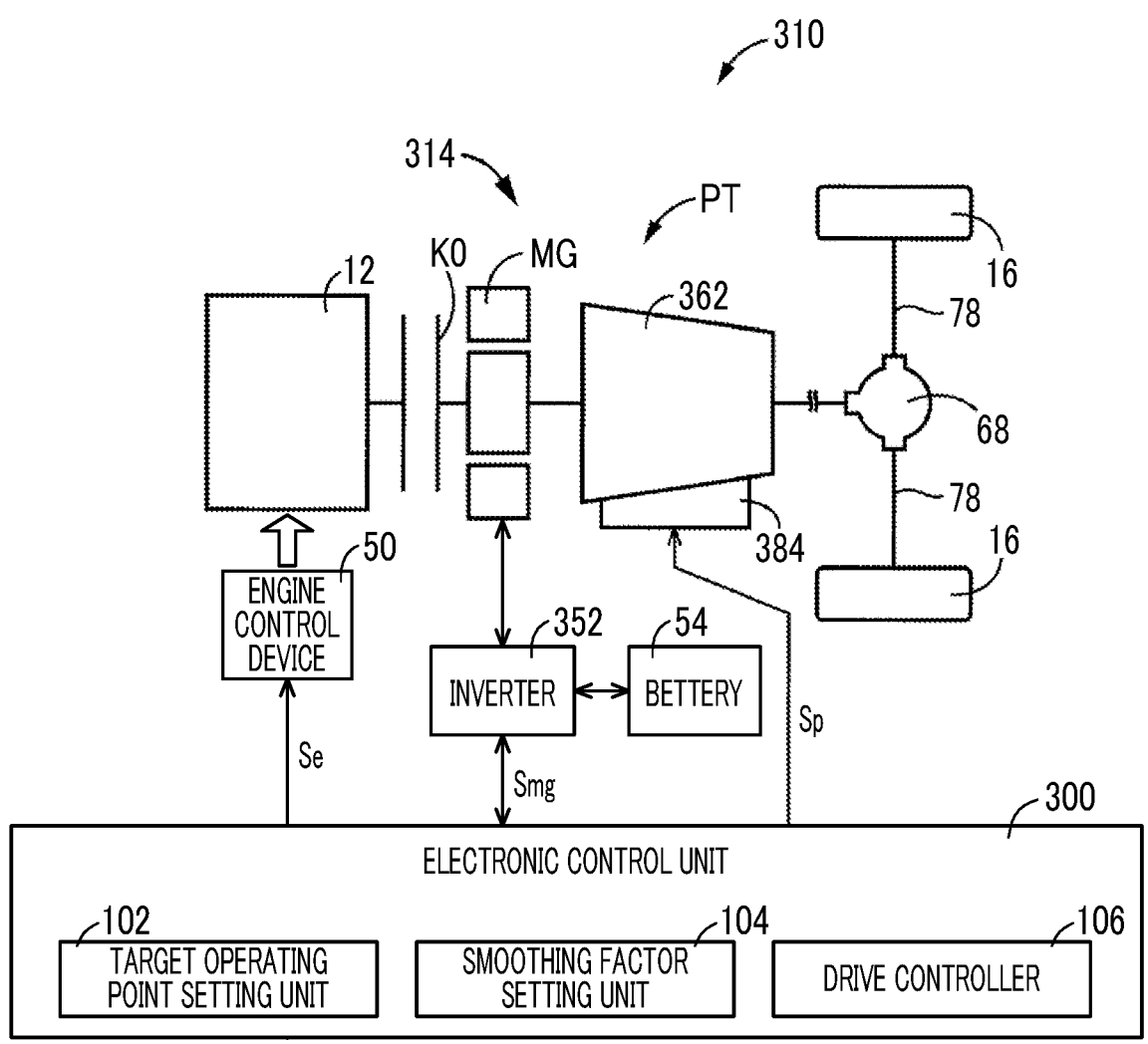
FIG. 14 is a schematic configuration diagram of a vehicle on which an electronic control unit according to a third embodiment of the disclosure is mounted, and is a functional block diagram illustrating main parts of a control functions for various controls in the vehicle.

FIG. 14 is a schematic configuration diagram of a vehicle 310 on which an electronic control unit 300 according to a third embodiment of the disclosure is mounted, and is a functional block diagram illustrating main parts of a control functions for various controls in the vehicle 310. The vehicle 310 is a hybrid vehicle including an engine 12, a rotating machine MG, a power transmission device 314, and drive wheels 16. In the third embodiment, the same reference numerals are given to portions substantially the same in function as those in the first embodiment, and the description will be appropriately omitted.

The engine torque Te of the engine 12 is controlled by controlling an engine control device 50 provided in the vehicle 310 by an electronic control unit 300 to be described later.

The rotating machine MG is a rotating electric machine having a function as an electric motor and a function as a generator, and is a so-called motor generator. The rotating machine MG is connected to a battery 54 provided in the vehicle 310 through an inverter 352 provided in the vehicle 310. In the rotating machine MG, the MG torque Tmg, which is the output torque of the rotating machine MG, is controlled by controlling the inverter 352 by an electronic control unit 300 to be described later. The battery 54 is charged with the generated electric power Wg of the rotating machine MG, and auxiliary equipment such as air conditioners consumes the generated electric power. The rotating machine MG outputs MG torque Tmg by using electric power from battery 54.

The power transmission device 314 includes a clutch K0, an automatic transmission 362, and the like. The input rotating member of the automatic transmission 362 is connected to the engine 12 through the clutch K0 and is also directly connected to the rotating machine MG. The power transmission device 314 includes a differential gear 68 connected to the output side of the automatic transmission 362, a pair of axles 78 connected to the differential gear 68, and the like. In the power transmission device 314, the power of the engine 12 is transmitted to the drive wheels 16 sequentially through the clutch K0, the automatic transmission 362, the differential gear 68, the pair of axles 78, and the like. The power of the rotating machine MG can be transmitted to the drive wheels 16 through the automatic transmission 362 and the like. The engine 12 and the rotating machine MG are power sources for traveling of the vehicle 310, which are connected to the drive wheels 16 to transmit power. The clutch K0, the automatic transmission 362, the differential gear 68, and the axle 78 in the power transmission device 314 form a power transmission path PT provided between the engine 12 and the drive wheels 16. The rotating machine MG also has a function as a starter that cranks the engine 12 when the clutch K0 is engaged. It is noted that the rotating machine MG of the embodiment corresponds to a "rotating machine" in the disclosure.

The clutch K0 is a hydraulic friction engagement device that connects and disconnects the power transmission path PT between the engine 12 and the drive wheels 16.

The automatic transmission 362 is a known continuously variable transmission such as a belt-type continuously variable transmission including, for example, a primary pulley, a secondary pulley, and a transmission belt wound around the pulleys. In the automatic transmission 362, the V-groove widths of the primary pulley and the secondary pulley are changed by a hydraulic control circuit 384 controlled by an electronic control unit 300 to be described later, and the hooking diameter (effective diameter) of the transmission belt is changed accordingly. In this way, the gear ratio yat of the automatic transmission 362 is changed steplessly. In addition, the automatic transmission 362 corresponds to "the continuously variable transmission" in the disclosure.

In the vehicle 310, in a state where the clutch K0 is released and the operation of the engine 12 is stopped, EV traveling using just the rotating machine MG as a power source for traveling is possible by using electric power from the battery 54. In the vehicle 310, in a state where the clutch K0 is engaged, HV traveling using at least the engine 12 as a power source for traveling is possible by operating the engine 12.

The vehicle 310 has an engine traveling mode and an HV traveling mode in a state where the clutch K0 is engaged, where in the engine traveling mode the vehicle travels using just the engine 12 as a power source and in the HV traveling mode the vehicle travels using the engine 12 and the rotating machine MG as power sources. In any of the engine traveling mode and the HV traveling mode, when the request driving force Pwdem request for the vehicle 310 changes, the target engine operating point OPengtgt is set through a slow change process for obtaining the engine output Pe that slowly changes with respect to the request engine output Pedem achieving the request driving force Pwdem.

The vehicle 310 includes an electronic control unit 300 as a controller including a control device of the vehicle 310 related to control of the engine 12, the rotating machine MG, and the like. The electronic control unit 300 has the same configuration as the electronic control unit 100 shown in the first embodiment. Various signals and the like, which are similar to those input to the electronic control unit 100, are input to the electronic control unit 300. However, instead of the MG1 rotation speed Ng and the MG2 rotation speed Nm, an MG rotation speed Nmg [rpm] which is the rotation speed of the rotating machine MG sensed by an MG rotation speed sensor (not shown) is input. From the electronic control unit 300, various command signals, which are similar to those output by the electronic control unit 100, are output. However, the rotating machine control command signal Smg is a command signal for controlling the rotating machine MG. The electronic control unit 300 has functions similar to those of the target operating point setting unit 102, the smoothing factor setting unit 104, and the drive controller 106, similarly to the electronic control unit 100. Therefore, as in the first embodiment, when the amount ΔPchg of change in the turbocharging pressure is large, the smoothing factor τ used for the slow change process is set to a relatively large value, resulting in suppression of the rubber band feel, and when the amount ΔPchg of change in the turbocharging pressure is small, the smoothing factor used for the slow change process is set to a relatively small value, resulting in suppression of the feeling of sluggish. The engine operating point OPeng is set to the target engine operating point OPengtgt by controlling the engine 12 and the automatic transmission 362 that is a continuously variable transmission. The electronic control unit 300 corresponds to the "control device" in the disclosure.

According to the embodiment, the same effects as in the above first embodiment can be obtained.

Although the embodiments of the disclosure have been described in detail with reference to the drawings, the present disclosure is applicable to other modes.

In the flowchart of FIG. 10 in the first embodiment described above, the smoothing factor τ is set as four variables of the amount ΔPchg of change in the turbocharging pressure, the amount ΔNe of change in the engine speed, the amount ΔPwdem of change in the request driving force, and the torque assist rate Rasst, but is not limited to this mode. For example, the smoothing factor τ may be set using at least the amount ΔPchg of change in the turbocharging pressure as a variable, among the four variables. When the amount ΔPchg of change in the turbocharging pressure is included as a variable, the smoothing factor τ is set to a larger value when the amount ΔPchg of change in the turbocharging pressure is larger than when the amount ΔPchg is smaller, resulting in suppression of the rubber band feel, and, the smoothing factor is set to a smaller value when the amount ΔPchg of change in the turbocharging pressure is smaller than when the amount ΔPchg is larger, resulting in suppression of the feeling of sluggish.

In the above-described first to third embodiments, the torque assist rate Rasst is a constant value when the request driving force Pwdem changes due to an increase in the accelerator operation amount θacc, but is not limited to this mode. For example, the torque assist rate Rasst may be increased when the request driving force Pwdem changes due to an increase in the accelerator operation amount θacc.

In the above-described first to third embodiments, the slow change process based on the smoothing factor τ delays the changing rate of the engine operating point OPeng on a path a passing on the maximum efficiency line Leng toward the target engine operating point OPengtgt, but, the engine operating point OPeng may be changed to temporarily leave the maximum efficiency line Leng. For example, in the slow change process based on the smoothing factor τ, the engine operating point OPeng may be changed on a path where the engine torque Te increases more rapidly and the engine speed Ne increases more slowly than the path a, like the path b shown in FIG. 4 of the first embodiment described above. In the case of such a configuration, as the smoothing factor τ is larger, the engine operating point OPeng is changed on a path farther from the path a, that is, a path on which the engine speed Ne increases more slowly, thereby making it possible to obtain the engine output Pe with a substantially delayed changing rate. Thus, the rubber band feel is suppressed by slowly changing the engine output Pe.

In the above-described first to third embodiments, the smoothing factor τ is defined as the ratio of rising rates or ratio of changing times of the engine speed Ne or the engine output Pe during the period in which the engine operating point changed from the current engine operating point OPeng_c to the target engine operating point OPengtgt by way of example, but the smoothing factor is not limited thereto. For example, the smoothing factor τ may be defined as a time constant of a first-order delay function.

In the first embodiment described above, the vehicle 10 may be a vehicle in which the transmission unit 58 is not provided and the engine 12 is connected to the differential unit 60. The differential unit 60 may be a mechanism capable of limiting a differential operation by controlling a clutch or a brake connected to a rotating element of the second planetary gear mechanism 82. Further, the second planetary gear mechanism 82 may be a double pinion type planetary gear device. Further, the second planetary gear mechanism 82 may be a differential mechanism in which a plurality of planetary gear devices is connected to each other to have four or more rotating elements. The second planetary gear mechanism 82 may be a differential gear device in which the first rotating machine MG1 and the drive gear 74 are connected to a pinion that is driven to rotate by the engine 12 and a pair of bevel gears that mesh with the pinion, respectively. The second planetary gear mechanism 82 may be a mechanism having a configuration in which two or more planetary gear devices are connected to each other by some of the rotating elements constituting the planetary gear mechanisms, and the engine 12, the first rotating machine MG1, and the drive wheels 16 are connected to the rotating elements of the planetary gear devices, respectively, to transmit power.

In the above-described second embodiment, the one-way clutch F0 is exemplified as the lock mechanism capable of fixing the carrier CA1 in a non-rotatable state, but the present disclosure is not limited to this mode. This lock mechanism may be an engagement device such as a meshing type clutch, a hydraulic friction engagement device such as a clutch and a brake, a dry engagement device, an electromagnetic friction engagement device, a magnetic powder clutch, for example, for selectively connecting the input shaft 272 and the case 256. Alternatively, the vehicle 210 does not necessarily need to include the one-way clutch F0.

In the first to third embodiments, the turbocharger 18 is a known exhaust turbine type turbocharger, but is not limited to this mode. For example, the turbocharger 18 may be a mechanical pump type turbocharger that is rotationally driven by an engine or an electric motor. Further, as the turbocharger, an exhaust turbine type turbocharger and a mechanical pump type turbocharger may be provided in combination.

In the above-described first to third embodiments, the vehicles 10, 210, and 310 are the hybrid vehicles including the first rotating machine MG1 and the second rotating machine MG2, or the rotating machine MG, respectively, but are not limited thereto. For example, the disclosure is also applicable to a vehicle that does not include a rotating machine and includes merely an engine 12 (with a turbocharger 18) that is an internal combustion engine as a power source.

It should be noted that the above description is merely embodiments, and that the present disclosure can be implemented in various modified and improved forms based on the knowledge of those skilled in the art without departing from spirit of the disclosure.

What is claimed is:

1. A control device of a vehicle including an engine having a turbocharger and a continuously variable transmission provided in a power transmission path between the engine and drive wheels, the control device comprising:
   an electronic control unit (ECU) including a microcomputer having a CPU, a RAM, a ROM and an input/output interface for performing various controls of the vehicle by using a temporary storage function of the RAM and performing signal processing according to a program stored in the ROM in advance, the ECU further programmed to:
   calculate a request driving force requested for the vehicle based on an accelerator operation amount, and set a target operating point of the engine through a slow change process for obtaining an engine output that changes slowly with respect to a request engine output achieving the calculated request driving force based on the calculated request driving force;
   change a smoothing factor used for the slow change process according to an amount of change in a turbocharging pressure in the engine and set the smoothing factor to a smaller value when the amount of change in the turbocharging pressure is smaller than when the amount of change in the turbocharging pressure is larger; and
   control the engine and the continuously variable transmission such that the operating point of the engine becomes the target operating point.

2. The control device according to claim 1, wherein the ECU is further configured to change the smoothing factor according to an amount of change in an engine speed and set the smoothing factor to a larger value when the amount of change in the engine speed is larger than when the amount of change in the engine speed is smaller.

3. The control device according to claim 1, wherein the ECU is further configured to change the smoothing factor according to an amount of change in the request driving force and set the smoothing factor to be a larger value when the amount of change in the request driving force is larger than when the amount of change in the request driving force is smaller.

4. The control device according to claim 1, wherein:
the vehicle includes a rotating machine connected to the power transmission path, and
the ECU is further configured to change the smoothing factor according to a torque assist rate of the rotating machine and set the smoothing factor to be a larger value when the torque assist rate is smaller than when the torque assist rate is larger.

* * * * *